(12) United States Patent
Segura Puchades

(10) Patent No.: US 11,889,208 B2
(45) Date of Patent: *Jan. 30, 2024

(54) FLAG-BASED READOUT ARCHITECTURE FOR EVENT-DRIVEN PIXEL MATRIX ARRAY

(71) Applicant: Commissariat à l'Énergie Atomique et aux Énergies Alternatives, Paris (FR)

(72) Inventor: Josep Segura Puchades, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,900

(22) Filed: Jul. 22, 2022

(65) Prior Publication Data

US 2023/0023815 A1    Jan. 26, 2023

(30) Foreign Application Priority Data

Jul. 26, 2021 (FR) ...................................... 2108087

(51) Int. Cl.
*H04N 25/44* (2023.01)
*H04N 25/50* (2023.01)
*H04N 25/75* (2023.01)
*H04N 25/47* (2023.01)

(52) U.S. Cl.
CPC ............. *H04N 25/44* (2023.01); *H04N 25/47* (2023.01); *H04N 25/50* (2023.01); *H04N 25/75* (2023.01)

(58) Field of Classification Search
CPC .... H04N 25/44; H04N 25/443; H04N 25/445; H04N 25/47; H04N 25/50; H04N 25/74; H04N 25/75; H04N 25/76
See application file for complete search history.

(56) References Cited

U.S. PATENT DOCUMENTS

| 7,843,503 B2 | 11/2010 | Ruedi et al. |
| 2016/0057366 A1 | 2/2016 | Lee et al. |
| 2018/0191982 A1 | 7/2018 | Berner et al. |
| 2021/0258525 A1* | 8/2021 | Matolin ................. H04N 25/40 |

(Continued)

OTHER PUBLICATIONS

Preliminary Search Report for French Application No. 2108087, dated May 2, 2022.

(Continued)

*Primary Examiner* — Lin Ye
*Assistant Examiner* — Chriss S Yoder, III
(74) *Attorney, Agent, or Firm* — Wolf, Greenfield & Sacks, P.C.

(57) ABSTRACT

An event-driven sensor including: a pixel array; a column readout circuit coupled to column output lines of the pixel array, the column readout circuit comprising a plurality of groups of column register cells coupled in series with each other to propagate a first flag signal, wherein each column register cell is configured to activate a column event output signal when it receives the first flag signal while the detection of an event is indicated on the column output line; and a first bypassing circuit for each group of column register cells, the first bypassing circuits being coupled in series with each other to propagate the first flag signal.

11 Claims, 14 Drawing Sheets

(56) References Cited

U.S. PATENT DOCUMENTS

2023/0025549 A1* 1/2023 Segura Puchades ........................ H04N 25/767

OTHER PUBLICATIONS

Habibi, A low power smart CMOS image sensor for surveillance applications. 2010 6th Iranian Conference on Machine Vision and Image Processing (MVIP), IEEE. Oct. 27, 2010:1-4.
Fahim et al., A low-power, high-speed readout for pixel detectors based on an arbitration tree. IEEE Transactions on Very Large Scale Integration (VLSI) Systems. Dec. 11, 2019;28(2):576-84.
FR2108087, May 2, 2022, Preliminary Search Report.

* cited by examiner

FLAG-BASED READOUT ARCHITECTURE FOR EVENT-DRIVEN PIXEL MATRIX ARRAY

CROSS-REFERENCE TO RELATED APPLICATION

This application claims priority to French application number 2108087, filed Jul. 26, 2021. The contents of which is incorporated herein by reference in its entirety.

TECHNICAL FIELD

The present disclosure relates generally to the field of sensor arrays for image or depth detection, and in particular to an event-driven pixel array and to a method of reading the same.

BACKGROUND ART

Image sensors comprising arrays of imaging pixels are capable of detecting illumination from an image scene, and of temporarily storing, at each pixel, an electrical signal (often a quantity of charge) that is representative of the detected illumination. The signals stored at the pixels are generally read out from the entire array row by row in a synchronous manner.

A drawback of such a readout approach is that it is relatively time and energy consuming, particularly for large pixel arrays. Furthermore, in many applications, particularly those involving some level of scene tracking, there may be relatively long periods during which there is nothing of interest to be captured, and/or there may be only one or several relatively small regions of interest within the pixel array at any given time. Event-driven pixel arrays aim to provide significant gains in terms of speed and energy consumption for such applications.

In an event-driven image sensor, each pixel is capable of signaling to the readout circuitry surrounding the array when it has detected an event. The readout circuitry should then determine the pixel coordinates of the pixel that detected the event, and in some cases readout a value stored in the pixel or elsewhere.

A problem is that the implementations of event-driven sensors in the prior art are relatively complex, meaning that the gains in energy efficiency are far from optimal. Furthermore, the readout speeds tend to be limited.

SUMMARY OF INVENTION

There is a need in the art for an improved event-driven pixel array and method of reading the same that at least partially addresses one or more problems in the prior art.

According to one aspect, there is provided an event-driven sensor comprising: a pixel array; a column readout circuit coupled to column output lines of the pixel array, the column readout circuit comprising a plurality of groups of column register cells, each column register cell being coupled to a corresponding one of the column output lines, the column register cells of each group being coupled in series with each other to propagate a first flag signal from a first to a last column register cell of the group, wherein each column register cell is configured to activate a column event output signal when it receives the first flag signal while the detection of an event is indicated on the column output line; and a first bypassing circuit for each group of column register cells, the first bypassing circuits being coupled in series with each other to propagate the first flag signal, each first bypassing circuit being configured to propagate the first flag signal: to the first column register cell of its group if an event is indicated on one of the column output lines coupled to one of the column register cells of the group; and to a flag output of the first bypassing circuit, bypassing the column register cells of the group, if no event is indicated on one of the column output lines coupled to one of the column register cells of the group.

According to one embodiment, each group of column register cells comprises at least four column register cells.

According to one embodiment, the first bypassing circuits are arranged in groups, each group of first bypassing circuits comprising a plurality of the first bypassing circuits configured to propagate the first flag signal from a first to a last first bypassing circuit of the group, the event-driven sensor further comprising a second bypassing circuit for each group of first bypassing circuits, second bypassing circuits being coupled in series with each other to propagate the first flag signal, each second bypassing circuit being configured to propagate the first flag signal to: the first bypassing circuit of its group of first bypassing circuits if an event is indicated on one of the column output lines coupled to one of the column register cells of the group of column register cells of one of the group of first bypassing circuits; and to a flag output of the second bypassing circuit, bypassing the first bypassing circuits of the second group, if no event is indicated on one of the column output lines coupled to one of the column register cells of the group of column register cells of one of the group of first bypassing circuits.

According to one embodiment, the column output lines are column readout request lines, the column readout circuit being further coupled to acknowledgement column lines of the pixel array, and wherein the row output lines are row readout request lines, the row readout circuit being further coupled to acknowledgement row lines of the pixel array.

According to one embodiment, the event-driven sensor further comprises a row readout circuit coupled to row output lines of the pixel array, the row readout circuit comprising, for each of the row output lines, or for each of a plurality of sub-groups of the row output lines, a row register cell coupled to the row output line or lines, the row register cells being coupled in series with each other to propagate a second flag signal, wherein each row register cell is configured to activate a row event output signal when it receives the second token while an event is indicated on the row output line, or on one of the row output lines of the sub-group.

According to one embodiment, a first pixel of the array is configured to assert, in response to a detected event, either: a column readout request on the column readout request line of the column of the first pixel, and to assert a row readout request on the row readout request line of the row of the first pixel in response to an acknowledgement signal on the acknowledgement column line; or a row readout request on the row readout request line of the row of the first pixel, and to assert a column readout request on the column readout request line of the column of the first pixel in response to an acknowledgement signal on the acknowledgement column line.

According to one embodiment, the first pixel of the array is further configured to deactivate the column and row readout requests in response to the acknowledgement signals being asserted on the acknowledgement column and row lines.

According to one embodiment, the row readout circuit comprises, for each of the plurality of sub-groups of the row output lines, a row register cell coupled to the row output lines of the sub-group, the row readout circuit further comprising a pattern generation circuit configured to generate a bit pattern indicating the row of the sub-group on which the event occurred.

According to one embodiment, each column output line is a shared column output line coupled to each of the pixels of its column, and each row output line is a shared row output line coupled to each of the pixels of its row.

According to one embodiment, each column output line is coupled in a daisy-chain to each of the pixels of its column, and each row output line is coupled in a daisy-chain to each of the pixels of its row.

According to a further aspect, there is provided a method of reading out an event from a pixel of an event-driven sensor, the method comprising: propagating, through a series of first bypassing circuits of a column readout circuit, a first flag signal, wherein the column readout circuit further comprises a plurality of groups of column register cells, each column register cell being coupled to a corresponding one of the column output lines, the column register cells of each group being coupled in series with each other to propagate the first flag signal from a first to a last column register cell of the group, wherein each first bypassing circuit is configured to propagate the first flag signal: to the first column register cell of its group if an event is indicated on one of the column output lines coupled to one of the column register cells of the group; and to a flag output of the first bypassing circuit, bypassing the column register cells of the group, if no event is indicated on one of the column output lines coupled to one of the column register cells of the group; and activating, by one of the column register cells, a column event output signal when it receives the first flag signal while an event is indicated on the column output line.

According to a further aspect, there is provided an event-driven sensor comprising: a pixel array; a column readout circuit coupled to column output lines of the pixel array, the column readout circuit comprising a plurality of column register cells, each column register cell being coupled to a corresponding one of the column output lines, wherein each column register cell is configured to activate a column event output signal in response to the detection of an event indicated on the column output line; and a row readout circuit comprising a readout memory having a storage location corresponding to each pixel of the pixel array, the readout memory having sets of one or more row lines for writing to rows of memory locations of the readout memory, wherein each row output line of the pixel array is coupled, via a corresponding row line control circuit, to a corresponding one of the sets of one or more row lines of the readout memory.

According to one embodiment, the readout memory further comprises sets of one or more column lines for controlling write operations to columns of memory locations of the readout memory, each set of one or more column lines being controlled based on a corresponding one of the column event output signals.

According to one embodiment, each row line control circuit is configured to supply one or more data bits representing pixel data to the corresponding set of one or more row lines, wherein the pixel data is either a pixel value output by a pixel of the pixel array, or is generated by sampling a time-varying signal.

According to one embodiment, the row readout circuit comprises a data register storing the pixel data prior to writing the pixel data to the memory.

According to one embodiment, the readout memory is a dual-port memory.

According to one embodiment, the column register cells are arranged in groups, the column register cells of each group being coupled in series with each other to propagate a first flag signal from a first to a last column register cell of the group, the event-driven sensor further comprising: a first bypassing circuit for each group of column register cells, the first bypassing circuits being coupled in series with each other to propagate the first flag signal, each first bypassing circuit being configured to propagate the first flag signal: to the first column register cell of its group if an event is indicated on one of the column output lines coupled to one of the column register cells of the group; and to a flag output of the first bypassing circuit, bypassing the column register cells of the group, if no event is indicated on one of the column output lines coupled to one of the column register cells of the group.

According to one embodiment, each group of column register cells comprises at least four column register cells.

According to one embodiment, the first bypassing circuits are arranged in groups, each group of first bypassing circuits comprising a plurality of the first bypassing circuits configured to propagate the first flag signal from a first to a last first bypassing circuit of the group, the event-driven sensor further comprising a second bypassing circuit for each group of first bypassing circuits, the second bypassing circuits being coupled in series with each other to propagate the first flag signal, each second bypassing circuit being configured to propagate the first flag signal to: the first bypassing circuit of its group of first bypassing circuits if an event is indicated on one of the column output lines coupled to one of the column register cells of the group of column register cells of one of the group of first bypassing circuits; and to a flag output of the second bypassing circuit, bypassing the first bypassing circuits of the second group, if no event is indicated on one of the column output lines coupled to one of the column register cells of the group of column register cells of one of the group of first bypassing circuits.

According to one embodiment, the column output lines are column readout request lines, the column readout circuit being further coupled to acknowledgement column lines of the pixel array, and wherein the row output lines are row readout request lines, the row readout circuit being further coupled to acknowledgement row lines of the pixel array.

According to one embodiment, a first pixel of the pixel array is configured to assert, in response to a detected event: a column readout request on the column readout request line of the column of the first pixel, and to assert a row readout request on the row readout request line of the row of the first pixel in response to an acknowledgement signal on the acknowledgement column line.

According to one embodiment, the first pixel of the array is further configured to deactivate the column and row readout requests in response to the acknowledgement signals being asserted on the acknowledgement column and row lines.

According to one embodiment, each column output line is a shared column output line coupled to each of the pixels of its column, and each row output line is a shared row output line coupled to each of the pixels of its row.

According to one embodiment, each column output line is coupled in a daisy-chain to each of the pixels of its column, and each row output line is coupled in a daisy-chain to each of the pixels of its row.

According to a further aspect, there is provided a method of reading out an event from a pixel of an event-driven sensor, the method comprising: activating, by a column register cell of a column readout circuit coupled to column output lines of a pixel array, a column event output signal in response to the detection of an event indicated on the column output line, wherein the column readout circuit comprises a plurality of said column register cells, each column register cell being coupled to a corresponding one of the column output lines; and writing pixel data to a readout memory of a row readout circuit, the readout memory having a storage location corresponding to each pixel of the pixel array, and sets of one or more row lines for writing to rows of memory locations of the readout memory, wherein each row output line of the pixel array is coupled, via a corresponding row line control circuit, to a corresponding one of the sets of one or more row lines of the readout memory.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, some embodiments described herein relate to image sensors, such as RGB (red, blue, green) sensors, and others to so-called depth sensors based on time-of-flight. The technical implementation of both of these types of sensors is well known to those skilled in the art, and has not been described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Whenever the term coupled is used, it will be understood that, unless indicated otherwise, a direct connection would also be possible.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
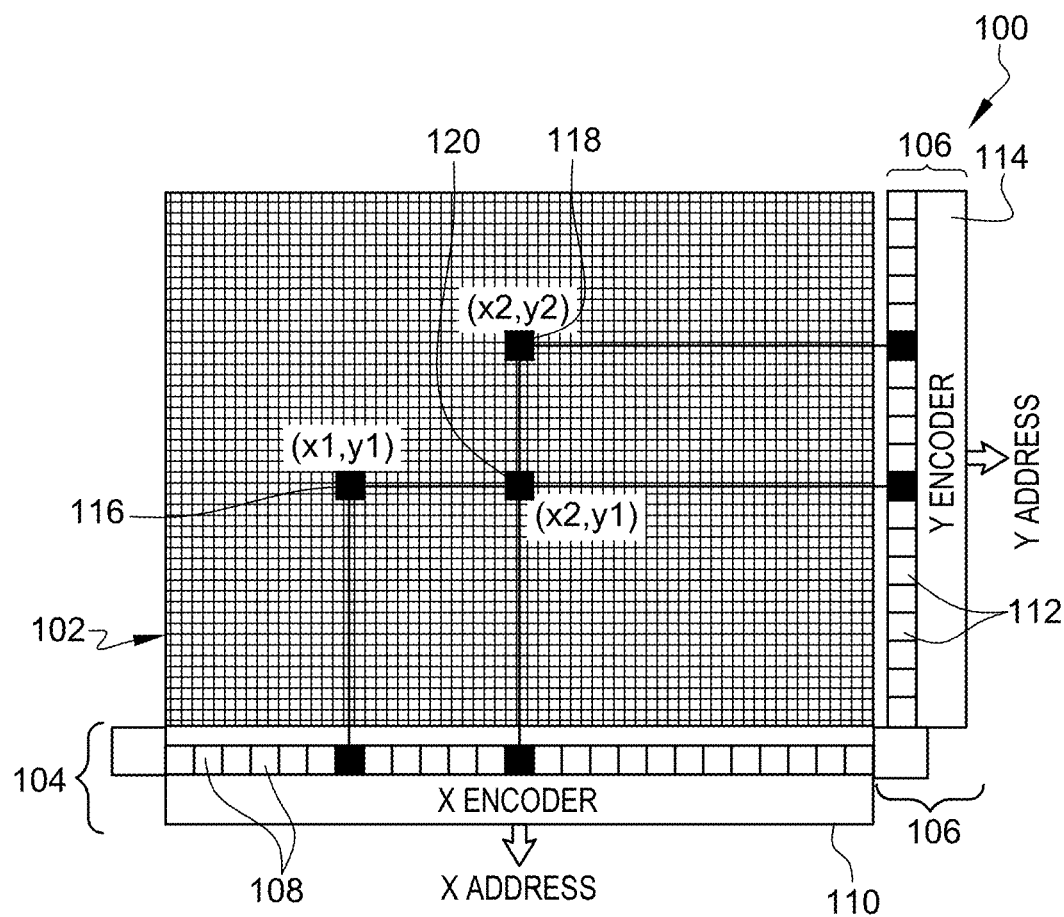
FIG. 1 schematically illustrates an example of an event-driven sensor.

FIG. 1 schematically illustrates an event-driven sensor 100, comprising an array 102 of pixels arranged in columns and rows, a column readout circuit 104 and a row readout circuit 106.

The column readout circuit 104 comprises a column register cell 108 for each column, and a column encoder (X ENCODER) 110 coupled to the column register cells 108 that provides column addresses (X ADDRESSES).

The row readout circuit 106 comprises a row register cell 112 for each row, and a row encoder (Y ENCODER) 114 coupled to the row register cells 112 that provides row addresses (Y ADDRESSES).

Three pixels 116, 118 and 120 of the pixel array 102 are represented in FIG. 1, these pixels being respectively at addresses (x1, y1), (x2, y2) and (x2, y1). Thus, the pixel 120 is in the same row as the pixel 116, and in the same column as the pixel 118. A challenge in an event-driven sensor is to be able to avoid address conflicts and thereby correctly encode the pixel address of an event when more than one pixel in the same column and/or same row signals an event at the same time. Indeed, if the pixels 116 and 118 at the addresses (x1, y1) and (x2, y2) both signal an event at the same time, there is a risk that the address (x2, y1) of pixel 120 will be erroneously indicated as the coordinates of either or both of the events.

To address this issue, according to embodiments of the present disclosure, a handshake protocol is for example implemented between the pixels and the column and row readout circuits 104, 106, and a flag-based priority scheme is for example implemented by each of the readout circuits 104, 106, as will now be described in more detail.

Figure 2A:
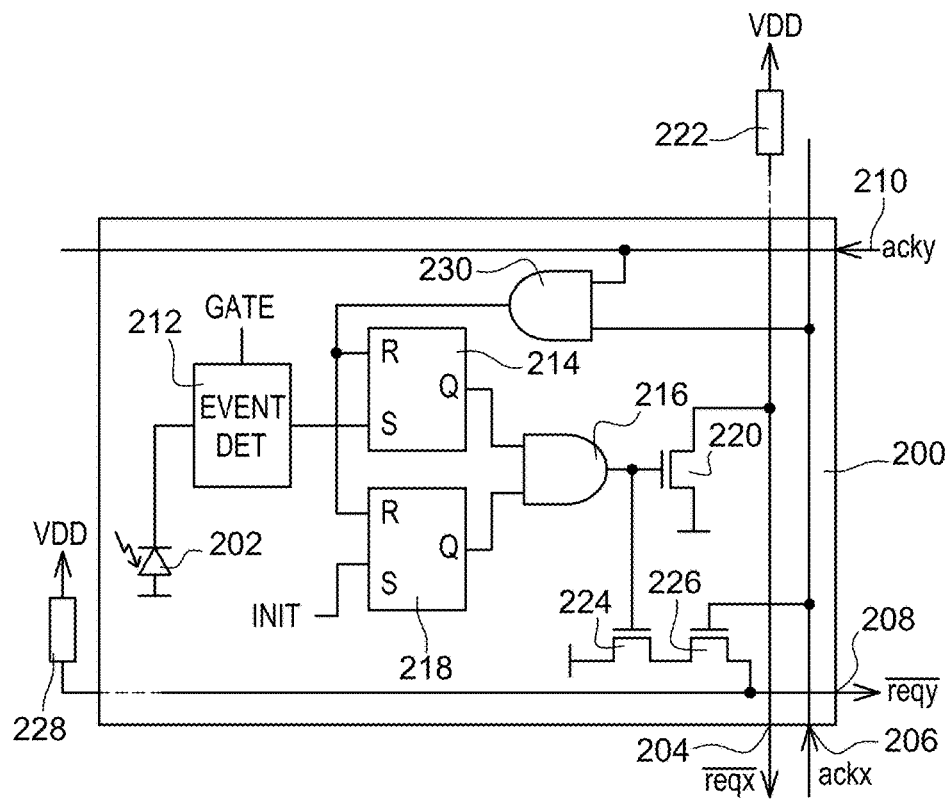
FIG. 2A schematically illustrates a pixel of an event-driven sensor according to an example embodiment of the present disclosure.

FIG. 2A schematically illustrates a pixel 200 of an event-driven sensor, such as the array 100 of FIG. 1, according to an example embodiment of the present disclosure.

The pixel 200 for example comprises a light-sensitive device 202, which is represented as a photodiode in the example of FIG. 2A. More generally, the device 202 is any device that generates an electrical signal as a function of the light that it receives from an image scene. For example, the device 202 could be a pinned photodiode or a SPAD (single-photon avalanche diode), or a more complex device that outputs an analog or digital output signal, such as a voltage or current representing light intensity, a photon count value, etc.

The pixel 200 is for example coupled to shared column lines 204 and 206, and shared row lines 208 and 210. The shared column lines 204, 206 are for example coupled to at least two, and generally to all, of the pixels of a column of the pixel array, and shared row lines 208, 210 are for example coupled to at least two, and generally to all, of the pixels of row of the pixel array.

The shared column line 204 is for example a column readout request line over which the pixel 200 indicates when it detects an event by asserting a column request signal $\overline{reqx}$. The shared column line 206 is for example an acknowledgement line over which the pixel 200 receives a column acknowledgement signal ackx indicating that the request has been registered by a corresponding column register cell (described in more detail below).

The shared row line 208 is for example a row readout request line over which the pixel 200 indicates when it has detected an event, and has received an acknowledgement ackx on the column acknowledge line 206, by asserting a request signal $\overline{reqy}$. The shared row line 210 is for example an acknowledgement line over which the pixel 200 receives a row acknowledgement signal acky indicating that the request has been registered by a corresponding row register circuit (described in more detail below).

The pixel 200 is for example configured to detect an event based on an electrical signal or value produced by the device 202, and to assert, in response, the request signal $\overline{reqx}$ on the line 204. The pixel 200 is then for example configured to detect when the acknowledgement signal ackx is asserted on the line 206, and to assert, in response, the request signal $\overline{reqy}$ on the line 208. The pixel 200 is then for example configured to detect when the acknowledgement signal acky is asserted on the line 210, and to reinitialize, in response, its event detection mechanism.

For performing these functions, the pixel 200 for example comprises an event detection circuit (EVENT DET) 212, having an input coupled to the device 202, and an output coupled to a memory circuit 214. The event detection circuit 212 is for example activated by a signal GATE, which is for example a common signal for all the pixels of the array. The memory circuit 214 is configured to store an event-detection state at its output Q until the event has been registered by the column and row event detection circuits. In some embodiments, the memory circuit 214 is implemented by an SR (set-reset) flip-flop, wherein the set input S of the flip-flop 214 receives the output of the event detection circuit 212. However, other implementations based on any bi-stable device would be possible.

In some embodiments, the output of the memory circuit 214 is coupled to one input of an AND gate 216, the other input of which is coupled to the output of a further memory circuit 218. The further memory circuit for example receives, at an input, a signal INIT, indicating when the pixel circuit 200 is to become active and thus capable of signaling events to the readout circuits. In some embodiments, the memory circuit 218 is implemented by an SR flip-flop 218 receiving the signal INIT at its set input S.

The output of the AND gate 216 for example activates a switch 220 that is configured to assert the request signal $\overline{reqx}$. In some embodiments, the request signal $\overline{reqx}$ is active low, and the switch 220 is implemented by a transistor, such as an n-channel MOS (NMOS) transistor, having its gate coupled to the output of the AND gate 216, and coupling, via its main conducting nodes, the line 204 to ground. In such a case, the line 204 is for example coupled, at one edge of the pixel array, to a supply voltage VDD via a resistor 222. Of course, it would be equally possible for the line 204 to be active high, by replacing NMOS transistors by PMOS transistors, and inverting their respective digital input command.

The output of the AND gate 216 also for example causes the request signal $\overline{reqy}$ to be asserted on the line 208 when the acknowledgement signal ackx on the line 206 is asserted. For example, the request signal $\overline{reqy}$ is asserted when two switches 224, 226 are activated, the switch 224 being activated by the output of the AND gate 216, and the switch 226 being activated by the acknowledgement signal ackx. In some embodiments, the request signal $\overline{reqy}$ is active low, and the switches 224, 226 are coupled in series with each other between the line 208 and ground. For example, the switches 224, 226 are implemented by transistors, such as NMOS transistors, coupled in series via their main conducting nodes, the switch 224 having its gate coupled to the output of the AND gate 216, and the switch 226 having its gate coupled to the line 206. In such a case, the line 208 is for example coupled, at one edge of the pixel array, to the supply voltage VDD via a resistor 228. Of course, it would be equally possible for the line 208 to be active high, by replacing NMOS transistors by PMOS transistors, and inverting their respective digital input command.

The reinitialization of the event detection mechanism in the pixel 200 is for example performed by an AND gate 230, which for example has one of its inputs coupled to the acknowledgement line 206, the other of its inputs coupled to the acknowledgement line 210, and its output coupled to the memory circuits 214, 218 in order to reset their states. In the case that the memory circuits 214, 218 are SR flip-flops, the output of the AND gate 230 is for example coupled to the reset input R of these flip-flops.

The signal INIT is for example a global signal for all pixels of the array. However, in some embodiments it would also be possible for the signal INIT to be common for the pixels of rows and/or columns of the pixel array, but independent between rows and/or columns. This would for example permit a sub-region of the pixel array to be defined as a region of interest, leading to a faster readout of this sub-region. In the case that the INIT signal is both row and column based, this would also for example permit a set of individual pixels to be selected in order to avoid reading out noisy or defective sensors. In such a case, an additional AND gate driving the S input of the flip-flop 218 is for example added to each pixel. Its inputs would be connected to column and row lines driven by X and Y peripheral circuits, such as shift registers. An activation sequence for selected pixels would for example be performed before running the image acquisition.

In alternative embodiments, the pixel 200 is always active, and thus no initialization signal INIT is provided. In such embodiments, the memory circuit 218 and the AND gate 216 could be omitted, the switches 220 and 224 for example being controlled directly by the Q output of the memory circuit 214.

The pixel 200 is for example capable of detecting an event, and of requesting the readout of this event detection state. Additionally, in some embodiments, the pixel 200 could be further configured to output a detected value, such as a light intensity value, or photon count, in addition to the event detection state. In such a case, an output to an additional shared column or row line is for example provided from each pixel in order to permit this signal to be output.

Figure 2B:
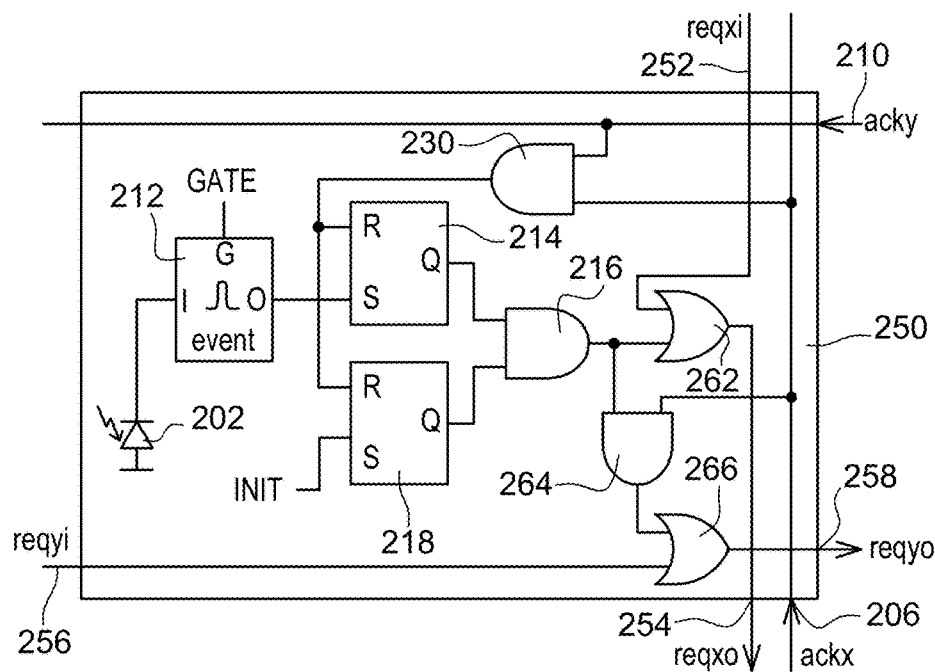
FIG. 2B schematically illustrates a pixel of an event-driven sensor according to a further example embodiment of the present disclosure.

FIG. 2B schematically illustrates a pixel 250 of an event-driven sensor, such as the array 100 of FIG. 1, according to an alternative embodiment to that of FIG. 2A. The embodiment of FIG. 2B has certain features in common with the embodiment of FIG. 2A, and these features have been labelled with like reference numerals and will not be described again in detail.

In the example of FIG. 2B, the request line 204 is replaced by an input request line 252 receiving a signal reqxi from an adjacent pixel of the column above the pixel 250, and an output request line 254 sending a signal reqxo to an adjacent pixel of the column below the pixel 250. The pixel at the top of the column for example has its request input line 252 coupled to a 0 V ground rail. Similarly, the request line 208 is replaced by an input request line 256 receiving a signal reqyi from an adjacent pixel of the row to the left of the pixel 250, and an output request line 258 sending a signal reqyo to an adjacent pixel of the row to the right of the pixel 250. The pixel at the far left of the row for example has its request input line 256 coupled to a 0 V ground rail.

Thus, in the example of FIG. 2B, the request lines are daisy-chained along each of the rows and columns of pixels.

Furthermore, in the example of FIG. 2B, the transistors 220, 224 and 226 are replaced by an OR gate 262, an AND gate 264 and an OR gate 266. The OR gate 262 receives at one of its inputs the output of AND gate 216, and at the other of its inputs the input request signal reqxi on the line 252. An output of the OR gate 262 provides the output request signal reqxo on the line 254.

The AND gate 264 has one of its inputs coupled to the output of AND gate 216, and the other of its input coupled to the acknowledgement line 206. The output of the AND gate 264 is coupled to one input of the OR gate 266. The other input of OR gate 266 receives the input request signal reqyi on the line 256. An output of the OR gate 266 provides the output request signal reqyo on the line 258.

Operation of the pixel 250 is similar to that of the pixel 200 of FIG. 2A. Indeed, when a column request signal reqxo or a row request signal reqyo is asserted by any pixel, this request signal will be conveyed to the end of the column or row via any intermediate pixels.

Figure 3A:
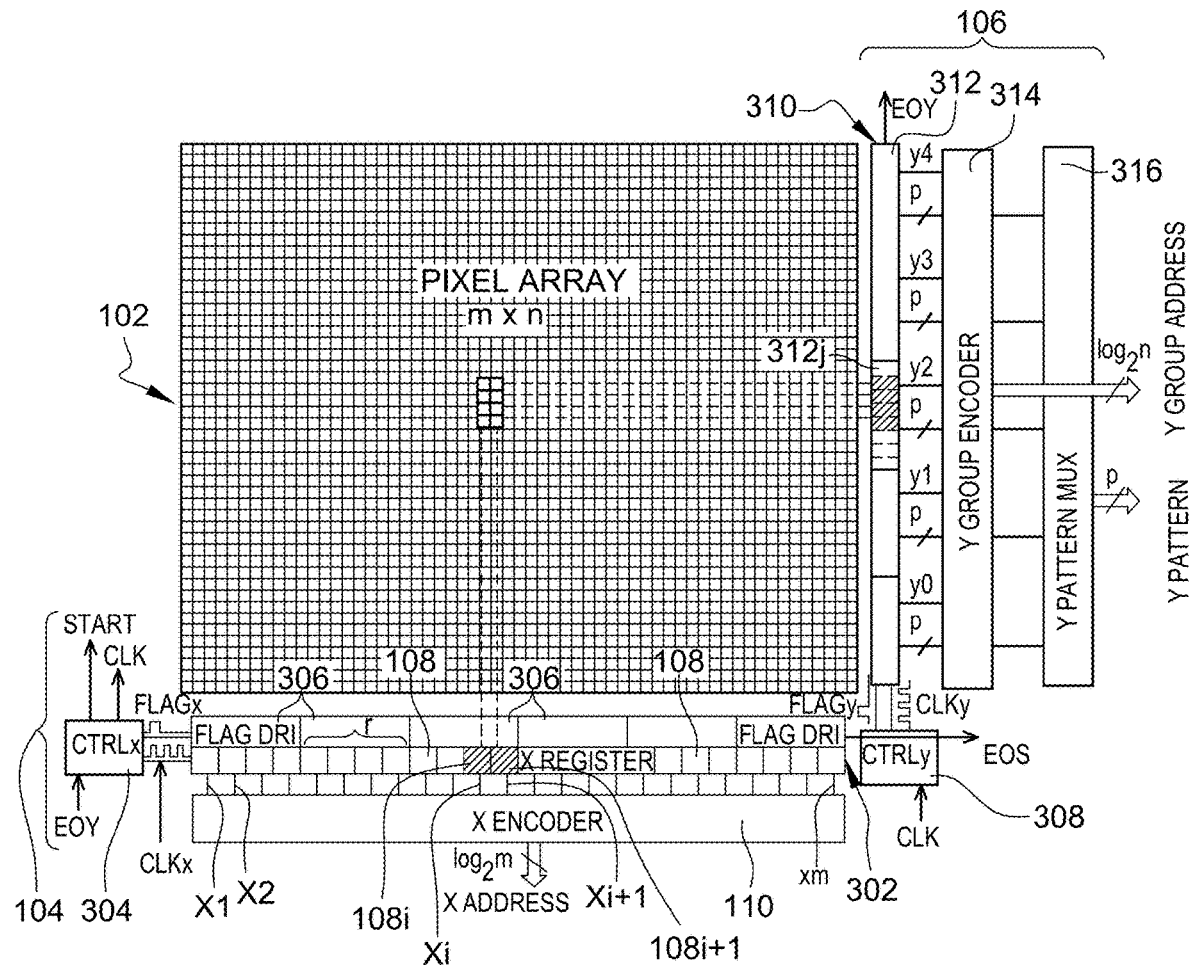
FIG. 3A schematically illustrates an event-driven sensor according to an example embodiment of the present disclosure.

FIG. 3A schematically illustrates an event-driven sensor 300 according to an example embodiment of the present disclosure. The sensor 300 for example comprises some features in common with the sensor 100 of FIG. 1, such as the pixel array (PIXEL ARRAY) 102, and like features have been labelled with like reference numerals.

In the embodiment of FIG. 3A, the column readout circuit 104 comprises a column register (X REGISTER) 302, the column encoder (X ENCODER) 110, and a column register control circuit (CTRLx) 304.

The column register 302 for example comprises the column register cells 108. For example, a column register cell 108 is provided for each column of the pixel array, and each cell 108 has an input coupled to the shared column line 204 of the column (not shown in FIG. 3A). An output of each of the cells 108 is for example provided to the column encoder 110. For example, there are m+1 cells 108, having respective outputs x1 to xm, which are provided to the column encoder 110.

The column register cells 108 are for example grouped into a plurality of g groups, each group for example consisting of r cells 108. In the example of FIG. 3A, g is equal to 6 and r is equal to 4. More generally, g and r are each for example integers equal to 2 or more.

The column register control circuit (CTRLx) 304 for example provides a flag signal FLAGx and a clock signal CLKx to the column register 302. The column register cells 108 are for example coupled in series with each other in each group, and are configured to propagate a flag represented by the flag signal FLAGx from a first cell of the group to a last cell of the group. The clock signal CLKx is for example provided to each of the cells 108.

The column register 302 also for example comprises a plurality of flag driver circuits (FLAG DRI) 306, one for example being provided for each group of column register cells 108. Thus, in the example of FIG. 3A, there are six flag driver circuits 306. The flag driver circuits 306 are coupled in series with each other to propagate the flag signal FLAGx. Each of the flag driver circuits 306 for example performs a role of bypassing the column register cells 108 of their group in the case than no event is present on the corresponding column lines.

For example, a flag driver circuit 306 at one end of the column register 302 (the left-hand side in the example FIG. 3A) associated with a first group of cells 108, receives, at a flag input, the flag signal FLAGx from the column register control circuit 304, and selectively propagates it to either a first of the column register cells 108 of its group, or to its output, which is coupled to an input of the next flag driver 306 in the series. The other flag driver circuits 306 operate in a similar manner, except that the last flag driver circuit 306 for example propagates the flag signal FLAGx to either a first of the column register cells 108 of its group, or to its output, which in that case is for example coupled to a row register control circuit (CTRLy) 308. Each flag driver circuit 306 is for example configured to propagate the flag signal: to the first column register cell 108 of its group if an event is indicated on any one of the column output lines coupled to one of the column register cells 108 of its group; and to a flag output of the flag driver circuit 306, thereby bypassing the column register cells 108 of the group, if no event is indicated on any of the column output lines coupled to one of the column register cells 108 of the group.

The column encoder 110 for example generates a column address X ADDRESS indicating the column of each detected event. In some embodiments, the column address is generated as a b-bit value, where the number of bits b is equal to $\log_2 m$, m being the number of columns equal to power of 2. In case the number of columns is not equal to a power of 2, the number of bits b is for example equal to $\log_2 M$, where M is the closest power of 2 that is higher than m.

The row readout circuit 106 for example comprises a row register (Y REGISTER) 310 comprising a plurality of row register circuits 312, each of which is for example coupled to a corresponding group of p row lines of the pixel array 102, where p is equal to 8 in the example of FIG. 3A. More generally, p is equal to at least 2. In the example of FIG. 3A, there are 5 row register circuits 312, although more generally there could be h row register circuits 312, where h is for example equal to at least 2. The row register circuits 312 are coupled in series with each other to propagate the flag signal FLAGy, which is for example supplied by the row register control circuit 308 to a first of the row register circuits 312, which is the bottom circuit 312 of the row register 310 in the example of FIG. 3A. The row register control circuit 308 also for example supplies a clock signal CLKy to each of the row register circuits 312. A last of the row register circuits 312, which is a top circuit of the row register 310 in the example of FIG. 3A, for example propagates the flag signal FLAGy by asserting an end of row scan signal EOY at its flag output.

Each row register circuit 312 for example generates a p-bit output signal representing the one or more row lines on which events are detected among the p row lines coupled to the detection circuit 310. Each row detection circuit 312 also for example generates a corresponding address signal $y_i$ indicating when one or more events has been detected on one of the corresponding rows, with i equal to 0 to h−1.

The row readout circuit 106 also for example comprises a row encoder (YGROUP ENCODER) 314, which is for example configured to generate, based on the address signals $y_i$ from each of the row register circuits 312, a portion (Y GROUP ADDRESS) of the row address of the pixel or pixels for which events have occurred. This address portion indicates in particular which of the circuits 312 received the event.

The row readout circuit 106 also for example comprises a multiplexer (Y PATTERN MUX) 316, which for example receives the p output lines from each of the row register circuits 312, and selects the pattern for which the flag signal FLAGy is active, in order to generate a further portion (Y PATTERN) of the row address of the pixel or pixels for which events have occurred. This address portion indicates in particular the row or rows of the row register circuit 312 with the flag signal FLAGx indicating the event.

The column register control circuit 304 for example receives a signal START indicating when event detection in the pixel array 102 is to be initiated, as well as a clock signal CLK, generated for example by a clock generator (not illustrated), and from which the clock signal CLKx is for example derived. The control circuit 304 also for example receives the end of row scan signal EOY from the row register 310.

The row register control circuit 308 also for example receives the clock signal CLK, which is for example used to derive the clock signal CLKy, and generates an end of scan signal EOS when one readout scan of events in the pixel array 102 has been completed.

The array 102 of pixels of FIG. 3A for example comprises the pixels 200 of FIG. 2A or 2B, each coupled by the corresponding request and acknowledgement lines 204, 206 (not illustrated in FIG. 3A) to the corresponding column register cell 108 of its column, and by the corresponding request and acknowledgement lines 208, 210 (also not illustrated in FIG. 3A) to a corresponding row register circuit 312 of its row. As explained in relation with FIGS. 2A and 2B, the request and acknowledgement lines 204, 206 are for example shared among the pixels of each column, and thus there are for example as many request lines 204, and as many acknowledgement lines 206, as columns in the array. Similarly, the request and acknowledgement lines 208, 210 are for example shared among the pixels of each row, and thus there are for example as many request lines 208, and as many acknowledgement lines 210, as rows in the array.

While FIG. 3A illustrates an example in which the column and row readout circuits 104, 106 are positioned at the edges of the array, in alternative embodiments, these circuits could for example be position elsewhere, such as in a separate tier in the case of a stacked 3D image sensor. In particular, the array 102 of pixels, or at least the sensor 202 of each pixel, and possibly the event detector 212, could for example be implemented in one tier optimized for detection, and the remaining circuits, including the readout circuits, could be implemented in another tier containing mostly digital circuits and optimized for speed.

Figure 3B:
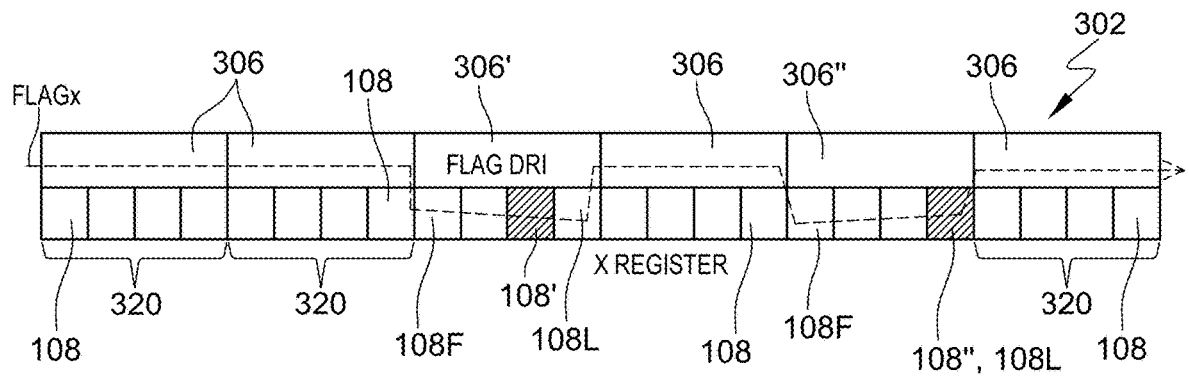
FIG. 3B schematically illustrates a column register of the event-driven sensor of FIG. 3A in more detail according to an example embodiment of the present disclosure.

FIG. 3B schematically illustrates the row register (X REGISTER) 302 of FIG. 3A according to an example embodiment, and illustrates the bypassing operation in more detail. In particular, a dashed arrow in FIG. 3B represents an example of the propagation of the flag signal FLAGx through the flag driver circuits 306 and column register cells 108, which are shown grouped in groups 320.

In the example of FIG. 3B, there are no events detected by pixels in the first eight columns of the pixel array 102, and thus the first two flag driver circuits 306 from the left in the figure propagate the flag signal FLAGx, bypassing the corresponding two groups of cells 108. There is, however, an event detection in a column coupled to a third cell 108' of the third group of cells 108 from the left. Therefore, the flag driver circuit 306' third from the left propagates the flag signal FLAGx to a first cell 108F of its group of cells, and the flag signal FLAGx then propagates through each cell of the group. When the flag signal FLAGx is received by the cell 108', it for example causes the event to be processed, and in particular a column address to be generated. The flag signal FLAGx then continues to propagate to a last cell 108L of the group, and is then propagated by the flag driver circuit 306' to the next flag driver circuit 306 in the sequence. There are no events detected by pixels in the columns of the pixel array 102 associated with the fourth flag driver circuit from the left, which thus propagates the flag signal FLAGx, bypassing the corresponding groups of cells 108. There is, however, an event detection in a column coupled to a fourth cell 108" of the fifth group of cells 108 from the left, which is also the last cell 108L of the group. Therefore, the flag driver circuit 306" fifth from the left propagates the flag signal FLAGx to a first cell 108F of its group of cells, and the flag signal FLAGx then propagates through each cell of the group. When the flag signal FLAGx is received by the cell 108", it for example causes the event to be processed, and in particular a column address to be generated. The flag signal FLAGx is then propagated by the flag driver circuit 306" to the next flag driver circuit 306 in the sequence, which is the sixth circuit from the left. There are no events detected by the columns of the pixel array 102 associated with the sixth flag driver circuit 306, which thus propagates the flag signal FLAGx to its flag output, which is also a flag output of the column register 302, bypassing the corresponding groups of cells 108.

Operation of the column and row readout circuits 104, 106 of FIG. 3A will now be described in more detail with reference to FIG. 4.

Figure 4:
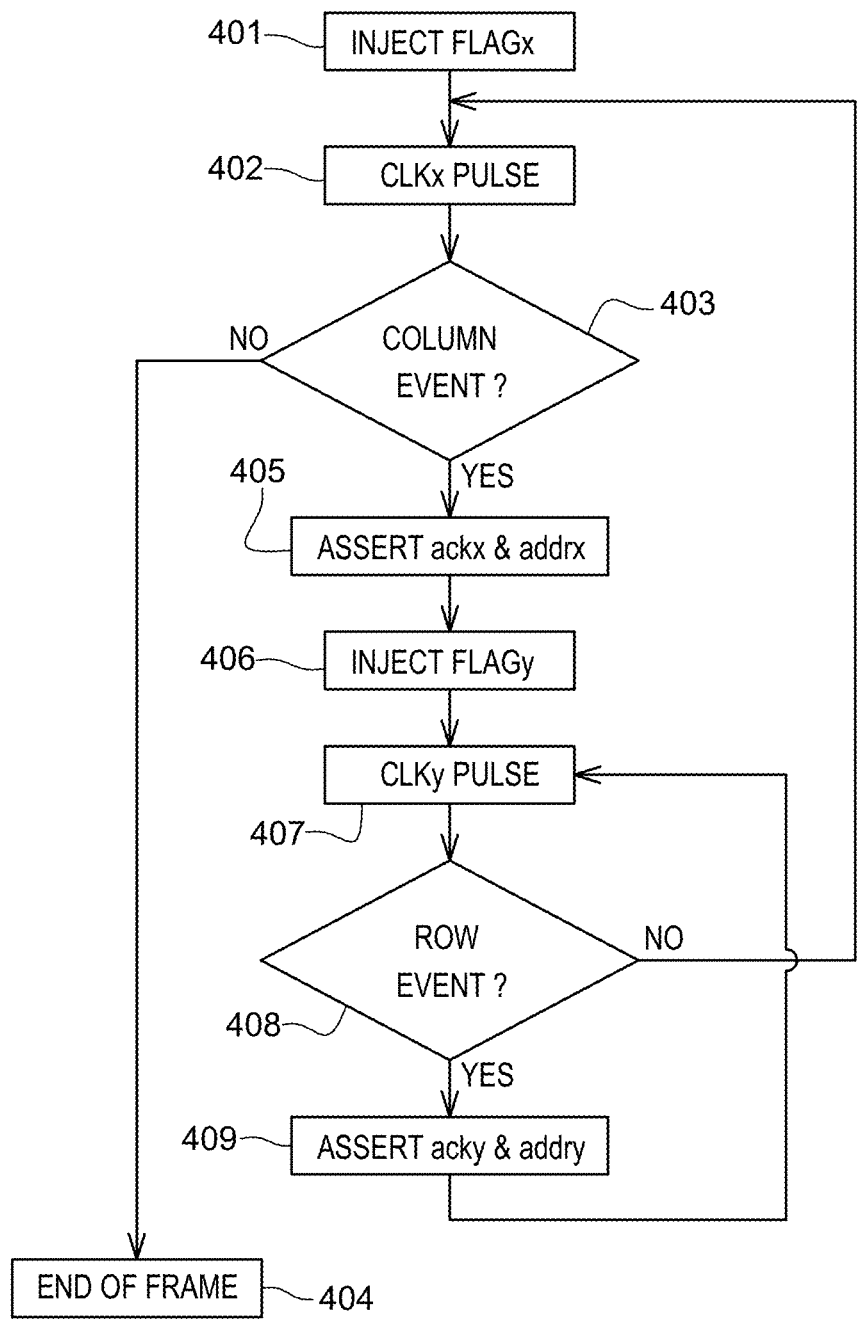
FIG. 4 is a flow diagram representing operations in a method of reading pixels in the event-driven sensor of FIG. 3A.

FIG. 4 is a flow diagram representing operations in a method of reading pixels in the event-driven sensor of FIG. 3A. This method is for example implemented at least partially by hardware, and in particular by the pixel circuit of FIG. 2A or 2B and by the column and row readout circuits 104, 106 of FIG. 3A. In some cases, the control circuits 304, 308 may be implemented entirely in hardware, for example by state machines, while in alternative embodiments these circuits could be implemented at least partially by software executed by one or more processors, such as by a microprocessor.

The method of FIG. 4 will be described with reference to an example of events detected by eight pixels in FIG. 3A.

In an operation 401 (INJECT FLAGx), the control circuit 304 for example injects the flag signal FLAGx into a first of the flag driver circuits 108. The flag signal FLAGx is for example in the form of a rising signal edge or a positive signal pulse, such as a rising voltage edge or a voltage pulse, although other representations of the flag signal would be possible, including a falling edge and/or a negative signal pulse. The flag signal FLAGx is for example propagated via the flag driver circuits 306 to a first column register cell 108 for which there is an event indicated on the column line. In the example of FIG. 3A, this is a cell 108i.

In an operation 402 (CLKx PULSE), there is a pulse of the clock signal CLKx, which is supplied to each of the column register cells 108.

In an operation 403 (COLUMN EVENT?), it is determined whether there is any column event not yet processed, in other words whether a pixel event has occurred and has been communicated via a column line. For example, this corresponds to an event of the $\overline{reqx}$ signal at any of the column register cells 108 that has not yet been processed. If not (branch NO), this implies that the end of the image frame has been reached, as represented by a block 404 (END OF FRAME). This is for example indicated by the end of scan signal EOS generated by the row control circuit 308, and which is for example supplied to other circuitry (not illustrated) in order to indicate that the current frame scan is complete. If, however, there is at least one event (branch YES), then the next operation is an operation 405.

In operation 405 (ASSERT ackx & addrx), the first column event detection cell 108 of the column register 302 at which an event is detected asserts the acknowledgement signal ackx on the acknowledgement line 206. Furthermore, the signal addrx is for example asserted by this cell 108, such that the column encoder 110 generates a corresponding column address.

Then, in an operation 406 (INJECT FLAGy), the row control circuit 308 for example injects the flag signal FLAGy into a first of the series of row register circuits 312. The flag signal FLAGy is for example in the form of a rising signal edge or a positive signal pulse, such as a rising voltage edge or a voltage pulse, although other representations of the flag signal would be possible, including a falling edge and/or negative signal pulse. The flag signal FLAGy is for example propagated to a first row register circuit 312 for which there is an event indicated on the column line. In the example of FIG. 3A, this is a circuit 312j.

In an operation 407 (CLKy PULSE), there is then a pulse of the clock signal CLKy, which is supplied to each of the row register circuits 312.

In an operation 408 (ROW EVENT?), it is determined whether there is any row event not yet processed, in other words whether a pixel has communicated a row event via one of the row lines. For example, this corresponds to an event of the $\overline{reqy}$ signal at any of the column register circuits 312. If not, this means that the Y scan has finished, the signal EOY is for example asserted by the row register 310, and the method for example returns to operation 402 in which a new clock pulse of the clock CLKx is applied. If, however, there is at least one row event to be processed, then the next operation is an operation 409.

In operation 409 (ASSERT acky & addry), the first row register circuit 312 of the row register 310 at which an event is detected asserts the acknowledgement signal acky on the acknowledgement line 210. Furthermore, the signal addry is for example asserted by this cell, such that the row group encoder 314 and multiplexer 316 generate a corresponding row address and row pattern. In the example of FIG. 3A, the circuit 312j for example asserts the signal $y_2$ as the row address and generates the row pattern "00011110" indicating that the first three row lines coupled to the circuit 312j have no event (e.g. bit value "0"), the next four row lines have events (e.g. bit value "1"), and the last row line has no event (e.g. bit value "0").

The method then for example returns to operation 407 in which there is a new pulse of the clock signal CLKy, and the operation 408 is repeated until there are no further row events in other row register circuits 312 to be processed. When this is the case (branch NO from operation 408), the method for example returns to the operation 402, in which a new pulse of the clock signal CLKx occurs, and the process is repeated until all column events and row events have been processed.

Thus, each read cycle is for example launched by the injection of the flag signal FLAGx and the occurrence of a pulse of the clock clkx. Once a read cycle has ended at the end of frame 404, a new read cycle may be launched immediately, or after a delay. For example, read cycles may be launched periodically, such as once every 10 milliseconds, in order to detect whether any event has occurred in the image scene. Alternatively, read cycles may be executed back to back, without any wait period between cycles.

Figure 5A:
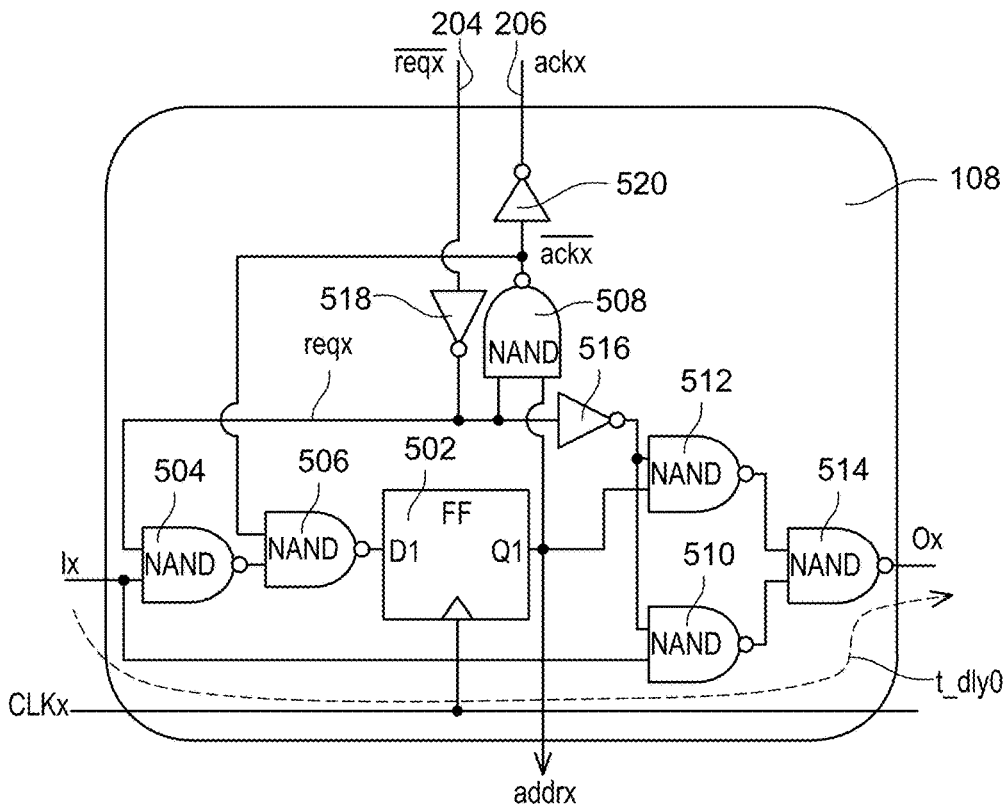
FIG. 5A schematically illustrates a column register cell of the column register of FIG. 3B in more detail according to an example embodiment.

FIG. 5A schematically illustrates one of the column register cells 108 of the column register 302 of FIG. 3A in more detail according to an example embodiment. Each of the cells 108 is for example implemented by a similar circuit.

The register cell 108 is for example implemented by a flip-flop 502 (FF), which is for example a D-type flip-flop, six NAND gates 504, 506, 508, 510, 512 and 514, and inverters 516 and 518.

In the example of FIG. 5A, a flag input Ix of the cell 108 is coupled to one input of the NAND gate 504, which has its second input coupled to the output of the inverter 518, which in turn has its input coupled to the request line 204. Thus, the inverter 518 generates the inverse reqx of the request signal $\overline{reqx}$. The output of the NAND gate 504 is coupled to one input of the NAND gate 506, which has its second input connected to the output of the NAND gate 508. The NAND gate 508 generates the inverse $\overline{ackx}$ of the acknowledgement signal ackx. The inverter 520 has its input coupled to the output of the NAND gate 508, and its output coupled to the acknowledgement line 206 providing the acknowledgement signal ackx. The output of the NAND gate 506 is coupled to a data input of the flip-flop 502, which has its clock input coupled to a clock input of the cell 108 receiving the clock signal CLKx. The output of the flip-flop 502 is coupled to one input of the NAND gate 508, and to one input of the NAND gate 512, and also provides the output signal addrx of the cell 108. The second input of the NAND gate 508 has its input coupled to the output of the inverter 518. The inverter 516 has its input coupled to the output of the inverter 518, and its output coupled to one input of the NAND gate 510, and to one input of the NAND gate 512. The outputs of the NAND gates 510, 512 are respectively coupled to corresponding inputs of the NAND gate 514, which has its output coupled to the flag output Ox of the cell 108.

In operation, when there is no column event, the request signal $\overline{reqx}$ is for example high, and the flag signal FLAGx arriving at the flag input Ix of the cell 108 is for example propagated directly to the flag output Ox of the cell 108 via the NAND gates 510, 512 and 514. When there is a column event, the signal $\overline{reqx}$ is low, and thus the output of the NAND 514 remains low upon arrival of the flag signal FLAGx at the flag input Ix. The output of the NANDs 504 and 506 will however go high in response to the arrival of the flag signal FLAGx. Thus, at the next clock pulse of the clock signal CLKx, the signals addrx and ackx will for example go high. The signal addrx indicates when an event has been detected in the column of pixels of the column register cell 108, and this signal for example enables the column decoder 110 of FIG. 3A to generate a column address of the pixel or pixels that detected an event.

Once the event has been processed by the row readout circuit 106, the request signal $\overline{reqx}$ will go high, causing the flag signal FLAGx to be asserted at the flag output Ox.

Figure 5B:
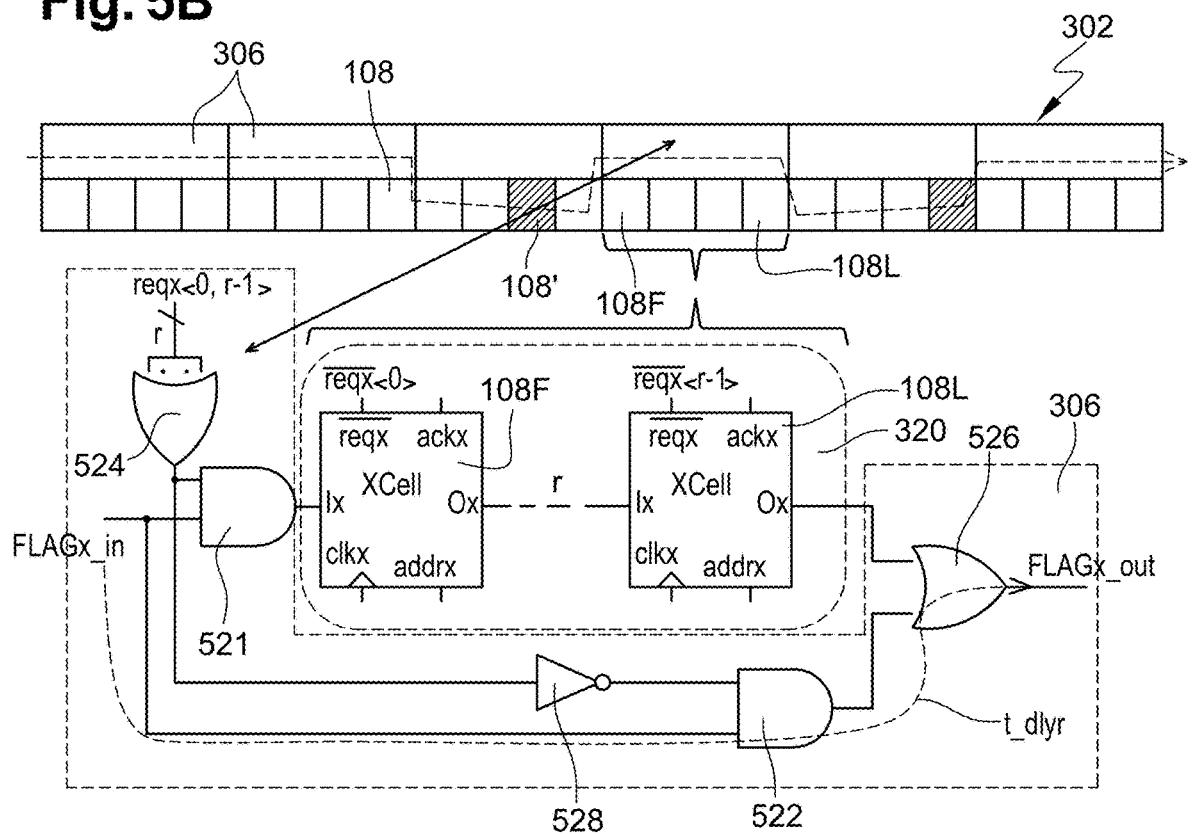
FIG. 5B schematically illustrates a flag driver circuit of the column register of FIG. 3B in more detail according to an example embodiment.

FIG. 5B schematically illustrates the column register 302, and also shows the sequence of cells 108F to 108L of one of the groups of r cells, and the corresponding flag driver circuit 306 in more detail.

In the example of FIG. 5B, the flag driver circuit 306 comprises two AND gates 521, 522, two OR gates 524, 526, and an inverter 528.

The OR gate 524 for example receives at its input the signal reqx from each of the r cells 108 of the corresponding group 320. For example, in the case that the request signal is an inverted signal $\overline{reqx}$, the signal reqx is provided by the inverter 518 of each cell 108. The output of the OR gate 524 is coupled to one input of the AND gate 521, and also to one input of the AND gate 522 via the inverter 528. The other input of each of the AND gates 521 and 522 is coupled to the flag signal input FLAGx_in of the flag driver circuit 306. The output of the AND gate 521 is coupled to the flag input of the first column register cell 108F of the group. The output of the AND gate 522 is coupled to one input of the OR gate 526, the other input of which is coupled to the flag output of the last column register cell 108L of the group. The output of the OR gate 526 is the flag output FLAGx_out of the flag driver circuit 306.

In operation, when any of the request signals reqx is high, indicating the presence of an event in one of the pixels of the corresponding columns, the flag signal FLAGx is coupled by the flag driver circuit 306 via the AND gate 521 to the group of cells 320. On the contrary, when there is no event in the pixels of the corresponding columns, the flag signal FLAGx is propagated by the AND gate 522 to the flag output FLAGx_out.

An advantage of the flag driver circuit 306 as described herein is that it permits the flag signal to reach any of the cells 108 of the column register in a relatively short time, permitting a fast readout frequency. For example, the maximum flag scan time for the flag to propagate between two cells is the time between the first and last cells 108, if only these two cells are active. This maximum flag scan time can be defined by the following equation:

$$t\_dmax = 2(r-1)t\_dly0 + \left(\frac{m}{r} - 2\right)t\_dlyr \quad [\text{Math 1}]$$

where r is the number of cells in each group, m is the number of columns of pixels in the array, and:
t_dly0 is the time delay of the flag propagation path through one cell 108 when no event is present, as represented by a dashed arrow in FIG. 5A; and
t_dlyr is the time delay of one of the flag driver circuits 306 when no event is present, as represented by a dashed arrow in FIG. 5B.

This time delay compares to a time delay of (m−2)t_dly0 if the cells 108 were to be used without flag driver circuits, which is much longer because the time delays t_dly0 and t_dlyr can have relatively similar values to each other, and m−2 is much greater than (2r−2)+(m/r−2).

It can be shown that, for a given number of columns m in the array, and assuming that t_dly0 and t_dlyr are equal, there is an optimum value r_opt of r equal to:

$$r\_opt = \sqrt{\frac{m}{2}} \quad [\text{Math 2}]$$

In some embodiments, the number r of cells in each group is chosen to equal this optimum value, or to the closest integer to this optimum value. As an example, assuming an array for which m=1000 and t_dly0=t_dlyr, r_opt=22. Furthermore, assuming that t_dly0=t_dlyr=10 ps, the maximum scan delay is 855 ps, which is compatible with clock speeds higher than 100 MHz, which would not be possible without the flag driver circuits 306.

While FIGS. 5A and 5B illustrate an example in which the groups of cells can be bypassed by one level of flag driver circuits, in alternative embodiments, one or more further levels of flag driver circuits could be provided to provide even shorter time delays, as will now be described in more detail with reference to FIG. 6.

Figure 6:
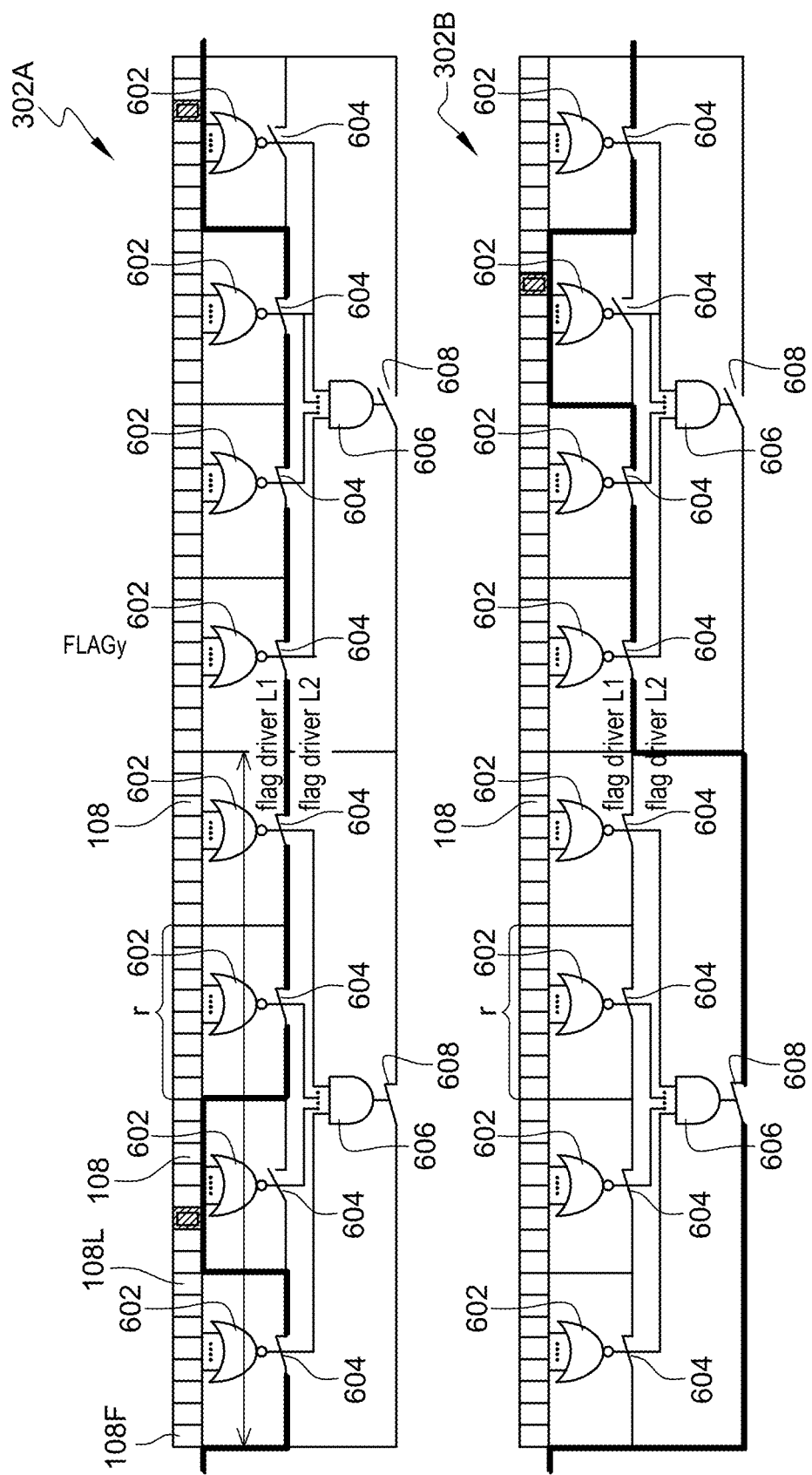
FIG. 6 schematically illustrates a column register according to a further example embodiment of the present disclosure.

FIG. 6 schematically illustrates the column register 302 according to a further example embodiment of the present disclosure. Two views 302A and 302B of the column register 302 are shown in order to illustrate two examples of operation.

In the column register 302 of FIG. 6, each group of cells 108 comprises 8 cells, and there are 8 groups. Of course, there could be a different number of groups and/or a different number of cells per group.

A first level of flag driver circuits 602 is represented by NOR gates 602 and bypass switches 604. Each NOR gates 602 perform a similar role to the OR gate 524 of FIG. 5B, activating or deactivating the corresponding bypass switch 604 for selectively bypassing the cells 108 of the group. The switches 604 perform a similar role to the inverter 528 and AND gate 522 of FIG. 5B. While not illustrated in FIG. 6, in case of event detection in one of the cells of a group, each first-level flag driver also for example includes a mechanism, like the AND gate 521, for supplying the flag signal to the first cell of the group, and a mechanism, like the OR gate 526, for supplying the flag signal from the last cell of the group to a flag output of the flag driver circuit.

A second level of flag driver circuits is also for example provided, as represented by AND gates 606 and bypass switches 608. There are for example a plurality of second-level flag drivers, each associated with a corresponding plurality of the first-level flag driver circuits. In particular, each AND gate 606 for example has inputs coupled to the outputs of the NOR gates 602 of its associated first-level flag driver circuits. In the example of FIG. 6, there are two AND gates 606, each having inputs coupled to a corresponding half of the first-level driver circuits.

While not shown in FIG. 6, it will be understood that each second level-flag driver circuit additionally comprises a mechanism such that, in case of event detection in one of the cells of one of group of first-level flag driver circuits, the flag signal is supplied to a first of the first-level flag driver circuits, and the flag signal is supplied from the last first-level flag driver circuit of the group to a flag output of the second-level flag driver circuit.

In the example shown in the view 302A, events are present at a third cell of the second group and at a sixth cell of the eighth group, these cells being shaded. In this case, neither of the second-level flag drivers is activated, and only the first-level flag drivers are used to bypass the first and third to seventh groups of cells 108.

In the example shown in the view 302B, an event is only present in the sixth cell of the seventh group of cells, this cell being shaded. In such a case, the first of the second-level flag driver circuits is activated to bypass the first group of first-level flag driver circuits, and the flag is then supplied to a first of the second group of first-level flag driver circuits. The fifth and sixth first-level flag driver circuits are then activated to bypass their respective groups of cells, and the flag is processed by the seventh group of cells.

Assuming a second level of flag driver circuits, the worst case propagation time now becomes:

$$t\_dmax'' = 2(r-1)t\_dly0 + 2(s-1)t\_dlyr + \left(\frac{m}{r \cdot s} - 2\right)t\_dlys \quad \text{[Math 3]}$$

where s is the number of first-level flag driver circuits in each group, and t_dlys is the time delay of one of the second-level flag driver circuits when no event is present.

Figure 7:
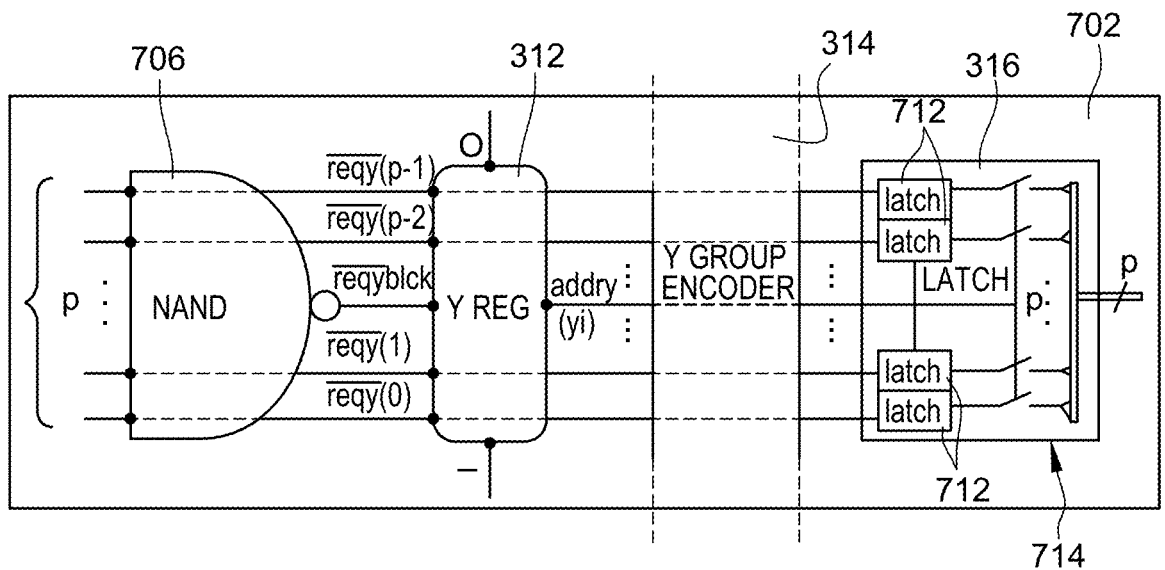
FIG. 7 schematically illustrates row readout circuitry according to an example embodiment of the present disclosure.

FIG. 7 schematically illustrates part of the row readout circuit 106 of FIG. 3A in more detail according to an example embodiment of the present disclosure.

In particular, FIG. 7 illustrates a sub-circuit 702 of the row readout circuit 106. In this embodiment, the row readout circuit 106 for example comprises a plurality of the sub-circuits 702. As illustrated in FIG. 7, each sub-circuit 702 for example comprises a corresponding one of the row register circuits (Y REG) 312 for a plurality of r rows of the pixel array. Each sub-circuit 702 also comprises a NAND gate 706, which for example combines the request signals $\overline{reqy}(0)$ to $\overline{reqy}(r-1)$ from the r rows to generate a combined request signal $\overline{reqyblck}$, which is provided to the circuit 312 in addition to the request signals reqy(0) to reqy(r-1).

The row register circuit 312 for example generates a signal addry, which indicates an event at the sub-circuit level. This signal is for example used by a y group encoder (Y GROUP ENCODER) 314 of the row readout circuit 106 to generate the sub-circuit address. Furthermore, the sub-circuit 702 comprises the multiplexer 316, which is for example used to generate, based on the request signals $\overline{reqy}(0)$ to $\overline{reqy}(r-1)$ and the signal addry, further bits of the y address, indicating the row of an event within the r rows. This circuit 316 for example comprises latches (latch) 712, each receiving a corresponding one of the request signals $\overline{reqy}(0)$ to $\overline{reqy}(r-1)$, the latches 712 for example being clocked by the signal addry, and providing an r-bit output signal via switches 714 indicating the row of the pixel event. The switches 714 are for example also controlled by the signal addry.

Figure 8:
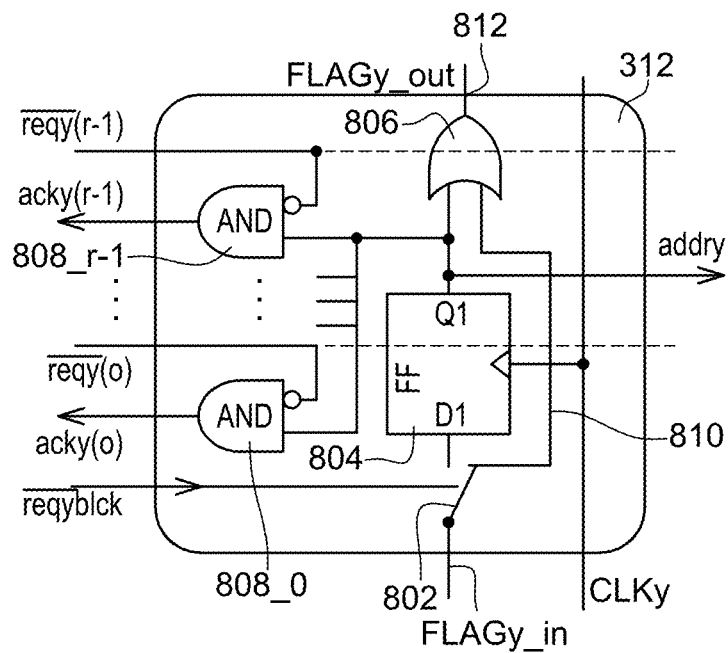
FIG. 8 schematically illustrates a row register of the row readout circuitry of FIG. 7 in more detail.

FIG. 8 schematically illustrates the row register circuit 312 of FIG. 7 in more detail according to an example embodiment.

Each row register circuit 312 for example comprises a three-way switch 802, a synchronous memory device 804 implemented for example by a flip-flop, an OR gate 806, and r AND gates 808_0 to 808_r−1. Each of the AND gates 808_0 to 808_r−1 for example receives, at an inverted input, a corresponding one of the request signals $\overline{reqy}(0)$ to $\overline{reqy}(r-1)$, and each for example generates a corresponding acknowledgement signal acky(0) to acky(r−1).

The three-way switch 802 is for example implemented by a demultiplexer, and receives at its input FLAGy_in the flag signal FLAGy either directly from the control circuit 304 in the case of the first register cell of the series, or, in the case of the other register cells in the series, via one or more of the other register cells. The switch 802 selectively supplies the flag signal FLAGy to either the data input D1 of the flip-flop 804, which is for example a D-type flip-flop, or via a bypass path 810 to an input of the OR gate 806. The switch 802 is for example controlled by the signal $\overline{reqyblck}$ generated by the NAND gate 706, and in particular, when this signal $\overline{reqyblck}$ is high, indicating an absence of a row event, the switch 802 for example supplies the flag signal FLAGy to the bypass path 810, and when the signal $\overline{reqyblck}$ is low, indicating the presence of a row event in one of the rows coupled to the circuit 312, the switch 802 for example supplies the flag signal FLAGy to the flip-flop 804.

The data output Q1 of the flip-flop 804 is for example coupled to another input of the OR gate 806. The flip-flop 804 is for example clocked by the clock signal CLKy.

The output Q1 of the flip-flop 804 is further coupled to one input of each AND gate 808_0 to 808_r−1.

The output Q1 of the flip-flop 804 also for example provides an output signal addry of the circuit 312, indicating when an event has been detected in one of the rows of pixels coupled to the circuit 312.

An output 812 of the OR gate 806 provides the flag signal FLAGy to the next row register circuit 312 of the series, or in the case of the final circuit 312 of the series, provides the row end-of-scan signal EOY.

Figure 9:
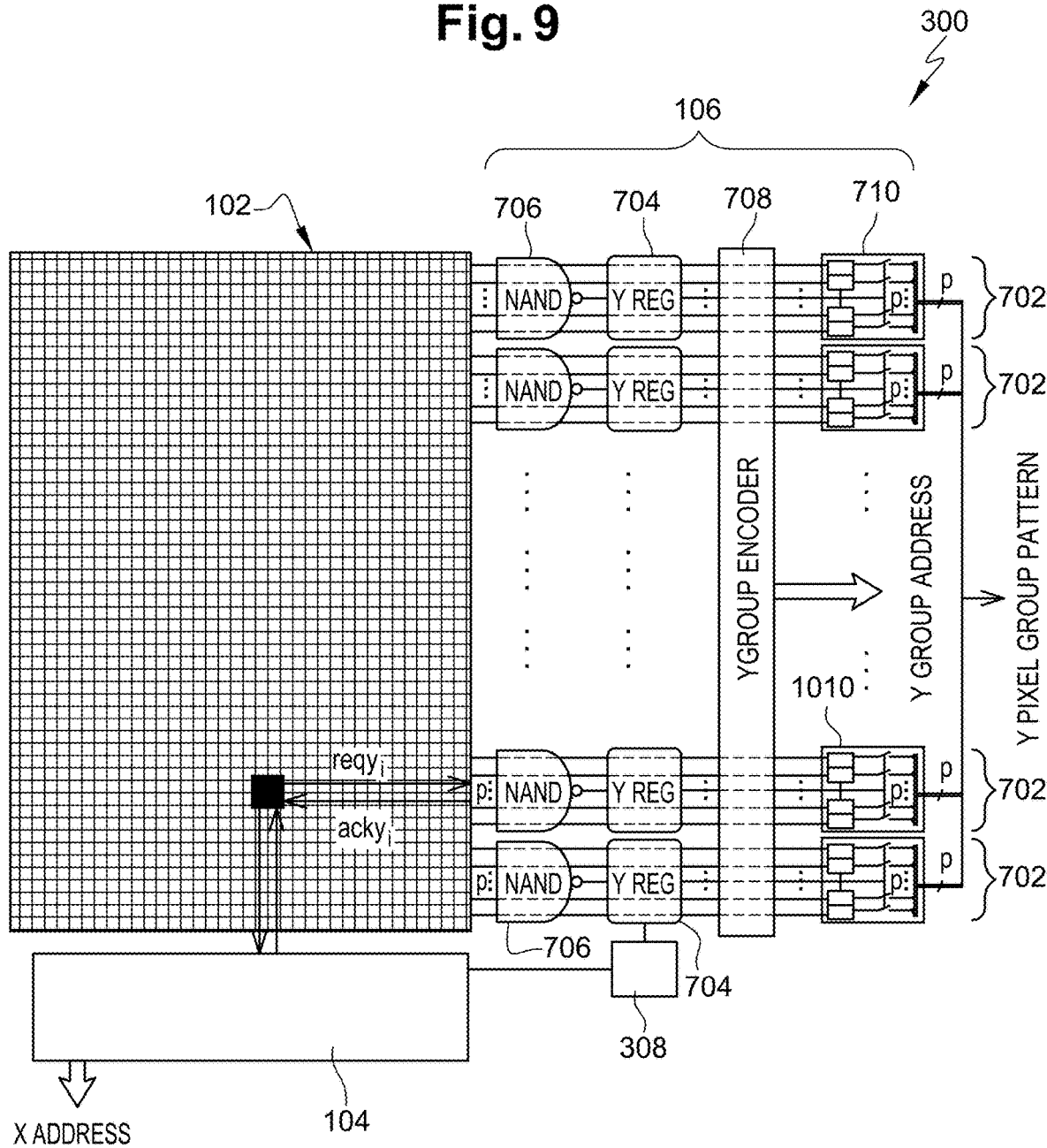
FIG. 9 schematically illustrates an event-driven sensor comprising the row readout circuitry of FIG. 7 according to an example embodiment of the present disclosure.

FIG. 9 schematically illustrates the event-driven sensor 300 of FIG. 3A in more detail according to one example, and comprising in particular the row readout circuitry of FIG. 7. As shown in FIG. 9, the row readout circuit 106 comprises the sub-circuit 702 of FIG. 7 repeated a plurality of times to provide the row address.

Figure 10:
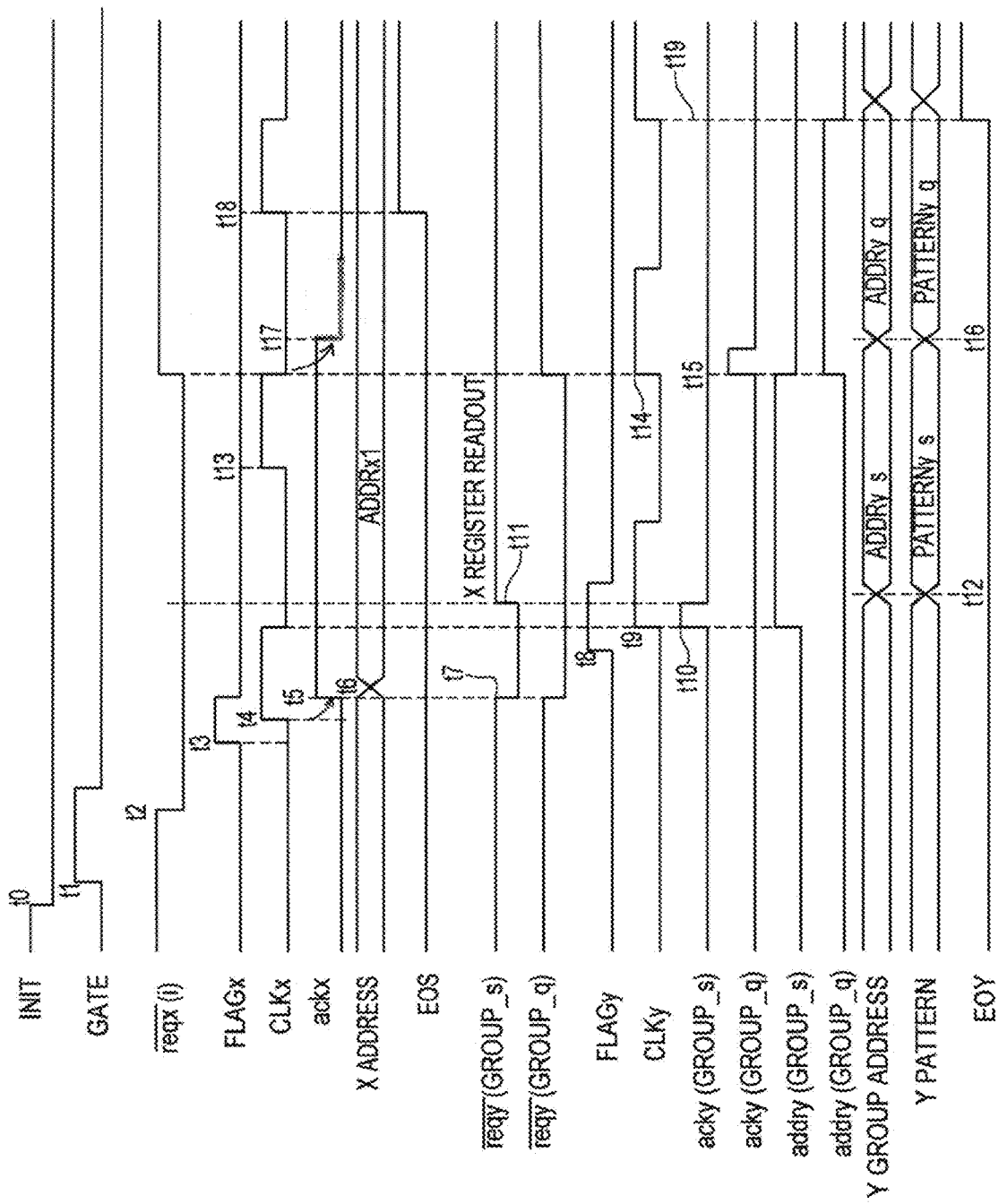
FIG. 10 is a timing diagram illustrating an example of reading two pixels in a same column of the sensor of FIG. 3A.

FIG. 10 is a timing diagram illustrating an example of reading two pixels in a same column, but in rows coupled to different row register circuits 312, of the sensor of FIG. 9. FIG. 10 illustrates examples of the signals INIT, GATE, the following signals associated with the column register read-out (X REGISTER READOUT): the request signal $\overline{reqx}(i)$ for an ith column, FLAGx, CLKx, ackx, X ADDRESS, and EOS, and the following signals associated with the row register readout (Y REGISTER READOUT): the request signal $\overline{reqy}(GROUP\_s)$ for a group s of rows coupled to one of the row register circuits 312, a request signal $\overline{reqy}(GROUP\_q)$ for a group q of rows coupled to another of the row register circuits 312, FLAGy, CLKy, the acknowledgement signal acky(GROUP_s) for the group s of rows, the acknowledgement signal acky(GROUP_q) for the group q of rows, addry(GROUP_s), which is the signal addry for the group s of rows, addry(GROUP_q), which is the signal addry for the group q of rows, Y GROUP ADDRESS, Y PATTERN and the end of row scan signal EOY.

The signal INIT for example goes low at a time t0 to activate the pixels of the pixel array, and the signal GATE for example has a high pulse starting at a time t1 to activate event detection. At a time t2, an event is detected by a pixel of the ith column, indicated by the signal $\overline{reqx}$(i) falling low. Sometime later, a read cycle is initiated, starting with a column scan. For example, while not represented in FIG. 10, the start signal START at the input of the control circuit 304 is for example asserted in order to trigger the column scan. To perform the column scan, the signal FLAGx for example comprises a pulse starting at a time t3 corresponding to the column flag, which in turn causes the output of OR gate 524 (see FIG. 5B) and the output of NAND gate 506 (see FIG. 5A) to go high. The clock signal CLKx for example has a rising edge at a time t4, which causes the output of the NAND gate 506 to be stored at the output Q1 of the flip-flop 502, and thus the acknowledgement signal ackx(i) goes high at a time t5. Furthermore, the address encoder for example receives the signal addrx, and thus generates a value ADDREx1 of the x address X ADDRESS at a time t6.

The acknowledgement signal ackx causes a pixel of a row of the group s of the ith column to assert the request signal $\overline{reqy}$(GROUP_s) at a time t7, and also another pixel of a row of the group q of the ith column to assert the request signal $\overline{reqy}$(GROUP_q) at substantially the same time t7. Sometime later, a row scan of the read cycle starts. In particular, the signal FLAGy comprises a pulse starting at a time t8 corresponding to the y flag, causing the data input of the flip-flop 804 (see FIG. 8) to go high. The clock signal CLKy has a rising edge at a time t9, which causes the output of the flip-flop 804 to go high, and thus the acknowledgement signal acky(GROUP_s) goes high shortly thereafter, at a time t10. The rise of the acknowledgement signal acky (GROUP_s) will for example cause the pixel of the ith column and group s of rows to bring high the request signal $\overline{reqy}$(GROUP_s) at a time tn. Furthermore, the signal addry (see FIG. 8) of the row of group s will be asserted, and the Y group encoder 314 will thus for example generate a first value ADDRy_s of the y group address Y GROUP ADDRESS, and a first value PATTERNy_s of the corresponding y pattern Y PATTERN, at a time t12. The y pattern PATTERNy_s for example indicates the position of the one or more activated rows within the group s.

After the releasing of the request signal $\overline{reqy}$(GROUP_s), the request signal $\overline{reqy}$(GROUP_q) for example remains low because there is a second pixel in the ith column that has yet to be read out. Therefore, at a next rising edge of the clock signal CLKx at a time t13, the flag FLAGx for example remains at the cell 108 of the ith column.

At a subsequent rising edge of the clock signal CLKy at a time t14, the flag FLAGy for example propagates to the row register circuit 312 of the row of group q, and thus the acknowledgment signal acky(GROUP_q) is for example asserted shortly thereafter at the time t15. The rise of the acknowledgement signal acky(GROUP_q) will for example also cause the pixel of the ith column and row of group q to bring high the request signals $\overline{reqy}$(GROUP_q) and bring low the request signal $\overline{reqx}$(i) at the time t15. Furthermore, the signal addry (see FIG. 8) of the row of group q will be asserted, and group encoder 314 will thus generate a second value ADDRy_q of the y group address Y GROUP ADDRESS, and a second value PATTERNy_q of the corresponding y pattern Y PATTERN, at a time t16. The y pattern PATTERNy_q for example indicates the position of the one or more activated rows within the group q.

At a time t17, the acknowledgement signal ackx for example goes low following the request signal $\overline{reqx}$(i) going high (see FIG. 5A). At a time t18, a subsequent rising edge of the clock signal CLKx for example causes the flag signal FLAGx to reach the end of the column register, and thus the end-of-scan signal EOS is for example asserted. This signal is for example provided to the column scan control circuit 304, in order to allow a subsequent column scan to be initiated.

Similarly, at a time t19, a subsequent rising edge of the clock signal CLKy for example causes the flag signal FLAGy to reach the end of the row register, and thus the end of y scan signal EOY is for example asserted. This signal is for example provided to the column scan control circuit 304, in order to allow a subsequent scan to be initiated.

In image sensor applications, the signal GATE provided to the pixels for example allows a global shutter operation to be applied to the array.

In time-of-flight (ToF) applications, the signal GATE in the pixel can be used to set a distance range for detection, as will now be described in more detail with reference to FIG. 11.

Figure 11:
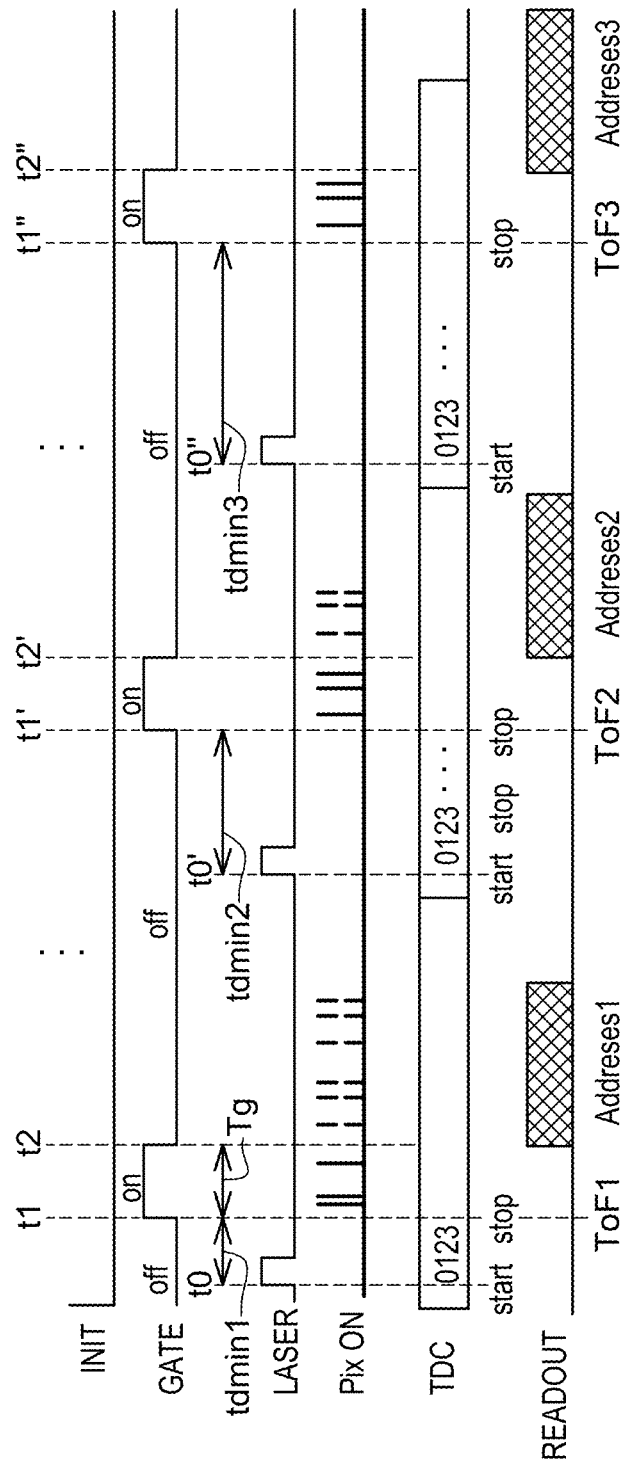
FIG. 11 is a timing diagram representing a time-of-flight pixel operation according to an example embodiment.

FIG. 11 is a timing diagram representing a time-of-flight (ToF) pixel operation according to an example embodiment of the present disclosure. FIG. 11 illustrates examples of the signals INIT, GATE, a signal LASER corresponding to the timing of transmission of an optical pulse into the image scene, a signal Pix ON representing detected signals within some pixels, a signal TDC for controlling the GATE signal, and a signal READOUT.

In the example FIG. 11, the signal LASER goes high at a time t0, corresponding to the time that a laser pulse is transmitted into the image scene. This pulse will be reflected by any objects present in the image scene, and the return pulse captured by the light-sensitive devices 202 of the pixels of the pixel array. The distance of objects in the image scene will influence the time duration that it takes for the pulse to perform the round trip.

At a time t1, a high pulse of the signal GATE for example starts, this pulse having a duration Tg, and ending at a time t2. Thus, return pulses returning to any pixels before t1, or after t2, will not be detected by the pixel, and events will only be generated during the interval t1 to t2. This is represented in FIG. 11 by the signals Pix ON of pixels, where only those occurring during the interval t1 to t2 are detected as events. This permits the signal GATE to be used to implement a distance detection for objects present within a certain distance range. The time duration tdmin1 between the time t0 and the time t1 sets the minimum distance at which objects will be detected. The duration Tg of the time interval sets the accuracy of the distance detection.

As represented in FIG. 11, the detection cycle may be repeated at times t0' and t0", in combination with pulses of the signal GATE starting respectively at times t1' and t1", and ending respectively at times t2' and t2". Time durations tdmin2 and tdmin3 between the times t0' and t1' respectively and the times t0" and t1" are for example different to the duration tdmin1, allowing different distances to be detected. In this manner, it is for example possible to scan a relatively large distance range in the image scene over several cycles.

In some embodiments, the read speed can be increased further by dividing the array 102 of pixels, and providing separate register cells and encoders operating in parallel, as will now be described with reference to FIG. 12.

Figure 12:
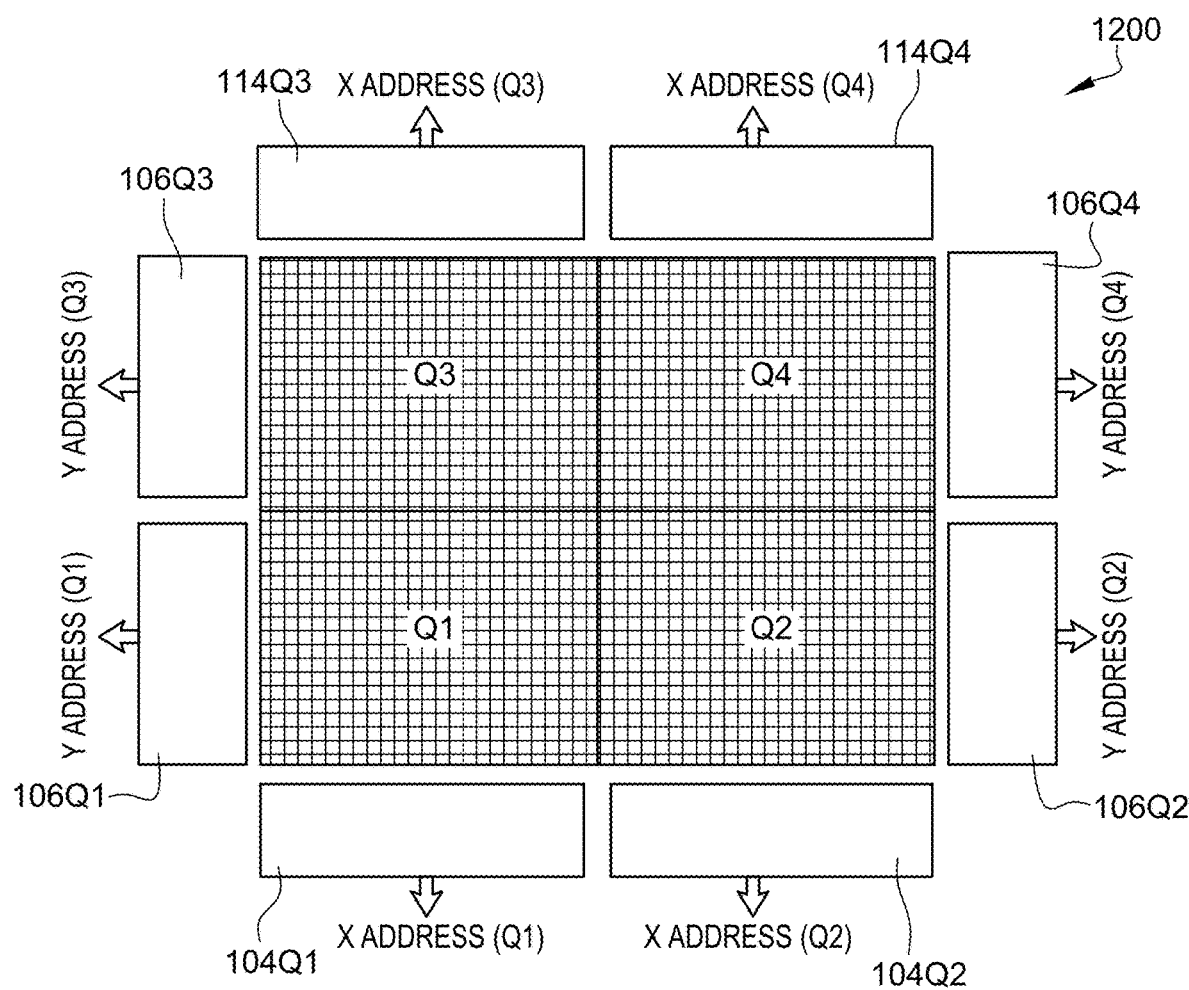
FIG. 12 schematically illustrates an event-driven sensor according to a further example embodiment of the present disclosure.

FIG. 12 schematically illustrates an event-driven sensor 1200 according to a further example embodiment of the present disclosure.

FIG. 12 schematically illustrates an event-driven sensor 1200 according to yet a further example embodiment of the present disclosure, in which the array 102 of pixels is divided into four regions of Q1, Q2, Q3 and Q4 of substantially equal size, and corresponding for example to quadrants of the pixel array. Each quadrant for example has a dedicated X and Y readout circuits 104, 106 as described herein, these elements being labelled in FIG. 12 with the same reference numerals as those used in FIG. 3A, but with the postscript "Q1", "Q2", "Q3" and "Q4" to designate the quadrant to which they belong. Thus, four scans, one for each of the four quadrants, can be performed simultaneously in the embodiment of FIG. 12, leading to four times the read speed.

While embodiments have been described in which the row readout circuit 106 is implemented based on row register circuits 312 that detect row events and allow row addresses to be generated, in alternative embodiments, read speeds can be further increased by using an embedded memory circuit implementing the row readout circuit, as will now be described in more detail with reference to FIG. 13.

Figure 13:
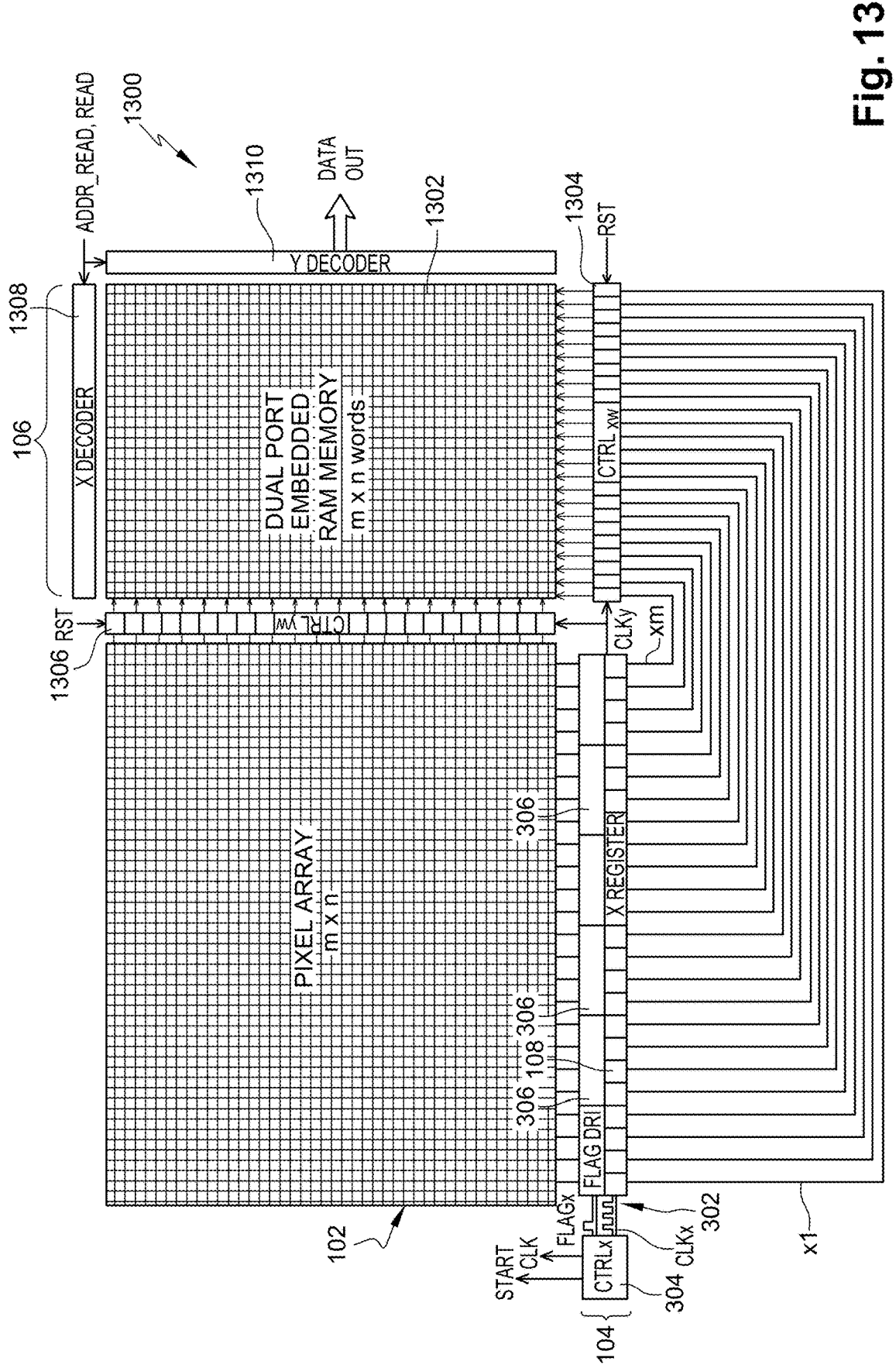
FIG. 13 schematically illustrates an event-driven sensor according to yet a further example embodiment of the present disclosure.

FIG. 13 schematically illustrates an event-driven sensor 1300 according to yet a further example embodiment of the present disclosure. Certain elements of FIG. 13 are the same as those of the sensor 300 of FIG. 3A, and those elements are labelled with like reference numerals and will not be described again in detail.

In the sensor 1300, the row readout circuit 106 comprises a memory (DUAL PORT EMBEDDED RAM MEMORY m×n WORDS) 1302, which is for example an array of addressable memory locations of at least dimensions of m by n, in other words having at least a memory location for each pixel of the pixel array 102. The memory 1302 is for example an embedded memory of the sensor 1300, in other words the elements of the sensors, including the pixel array 102 and memory 1302, are for example formed in a single integrated circuit.

The column readout circuit 104 for example comprises the control circuit (CTRLx) 304 and the column register 302, but no column encoder 110. Instead, the output lines x1 to xm of the column register cells 108 are for example coupled, via m corresponding column write control circuits (CTRL$_{xW}$) 1304, to bit lines of the memory 1302.

The row readout circuit 106 for example comprises, in addition to the memory 1302, n row write control circuits (CTRL$_{yW}$) 1306, each of which is coupled to a corresponding row line of the pixel array 102.

Each of the control circuits 1304, and each of the control circuits 1306, is for example clocked by the clock signal CLKy.

The control circuits 1304 and 1306 are for example configured to temporarily latch row and column events respectively until the time that they are written to the memory. Each of the column write control circuits 1304, and each of the row write control circuits 1306, also for example receives a reset signal RST, permitting the memory 102 to be initialized or reset to zeros. For example, the reset signal RST causes zeros, or another reset level, to be stored by each control circuit 1306, and also for example causes all of the columns of the memory to be activated, at the same time or one by one, by the control circuits 1304 in order to reset all memory locations of the memory 1302.

The row readout circuit 106 also for example comprises a column decoder (X DECODER) 1308 and a row decoder (Y DECODER) 1310, which are for example configured to select address locations in the memory 1302 to be read. For example, each of the column and row decoders 1308, 1310 receives an address signal ADDR_READ indicating one or more addresses to be read, and a read signal READ, indicating when the read operation is to be performed.

In some embodiments, each memory location of the memory 1302 stores a single bit, and indicates whether or not an event has occurred at the corresponding pixel of the pixel array 102.

In alternative embodiments, each memory location of the memory 1302 stores more than one bit, for example a word of 2 or more bits, such as 6, 8, 10 or 12 bits, indicating a signal level associated with the corresponding pixel of the pixel array 102.

In some embodiments, the memory 1302 is a single port memory, and after a pixel array readout phase in which the pixels are read, a memory readout phase is performing during which the memory 1302 is accessed using read operations to read out the contents of each memory location.

Alternatively, the memory 1302 is a dual port memory, and in this case reading of the memory 1302 can be performed simultaneously with the write operations to the memory during the scan operations. For example, sequential memory read operations can be performed continuously at a given rate, determined for example by a read clock, while the acquisition via the pixel array 102 is performed at a different rate determined for example by the clock signals CLKx and CLKy.

Example embodiments of the word line control circuits 1306 will now be described with reference to FIGS. 14 and 15.

Figure 14:
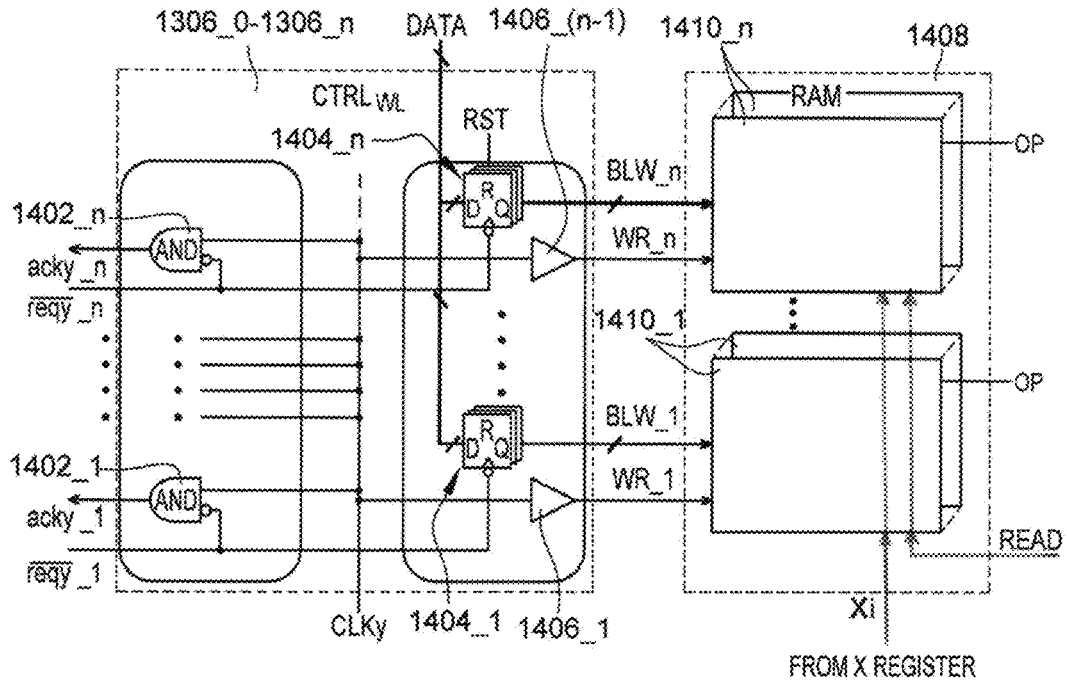
FIG. 14 schematically illustrates a word line control circuit and one column of a memory of the sensor of FIG. 13 in more detail according to an example embodiment of the present disclosure.

FIG. 14 schematically illustrates the n row write control circuits 1306_1 to 1306_n, and one column of a memory 1302 of the sensor of FIG. 13, in more detail according to an example embodiment of the present disclosure.

Each of the row write control circuits 1306_1 to 1306_n for example comprises an acknowledgement generation circuit 1402_1 to 1402_n. In the example of FIG. 14, the circuits 1402_1 to 1402_n are implemented by AND gates having two inputs, one of which is inverted. Each AND gate for example has its inverted input coupled to the corresponding request line $\overline{reqy}$_1 to $\overline{reqy}$_n and its other input coupled to the clock line receiving the clock signal CLKy.

Each of the row write control circuits 1306_1 to 1306_n also for example comprises a data register 1404_1 to 1404_n configured to temporarily store data to be written to the memory 1302. For example, each of the data registers 1404_1 to 1404_n comprises a plurality R of data registers, each implemented for example by a D-type flip-flop. Each data register for example has its data input D coupled to a corresponding bit of an R-bit data signal DATA, and its data output Q coupled to a corresponding bit line of a corresponding group BLW_1 to BLW_n of bit lines of the memory 1302, each group for example comprising R bit lines. Furthermore, each of the row write control circuits 1306_1 to 1306_n also for example comprises a buffer 1406_1 to 1406_n receiving the clock signal CLKy, and providing a corresponding row write signal WR_1 to WR_n to the memory 1302.

The data signal DATA is for example generated by a circuit that is external to the pixel array 102, and is for example a signal that varies with time. For example, the data signal DATA could be a count signal generated by a time counter, in other words a time to digital converter (TDC), or more generally a signal generated by a DAC (Digital to Analog Converter). The data signal DATA is for example common for each row, and the data registers 1404 are for example configured to sample this data signal at a time determined by the corresponding request signal $\overline{\text{reqy}\_1}$ to $\overline{\text{reqy}\_n}$ in order to store an appropriate value to the corresponding row and column of the memory 1302. In some embodiments, each pixel of the pixel array also receives the data signal DATA, and activates its corresponding request signal $\overline{\text{reqx}}$ to indicate an event based on a comparison between the data signal DATA and the detected signal. For example, the data signal DATA is a threshold value, and when the signal captured by a pixel exceeds this threshold, the event is generated, and the level of the threshold at that time is stored to memory as the pixel value.

One column 1408 of the memory 1302 is illustrated in FIG. 14, each column for example being implemented by a similar circuit. For each row 1 to n, the memory for example comprises a group of R memory cells 1410, the cells of each group being labelled 1410_1 to 1410_n. The cells are for example volatile memory cells, such as RAM (Random Access Memory) cells. In the example of FIG. 14, the cells are dual-port cells.

Each of the memory cells 1410_1 to 1410_n for example receives, in addition to the corresponding signals BLW and WR, the corresponding column write control signal xi (FROM X REGISTER) as an enable input, and the read signal READ. Thus, a write operation into the memory is for example performed in parallel by column, and the control signal xi for example activates an entire column for a write operation. When read, each of the memory cells 1410_1 to 1410_n for example generates an output signal OP. The memory cells 1410_1 to 1410_n are for example implemented by dual port memory circuits, which are known to those skilled in the art.

Figure 15:
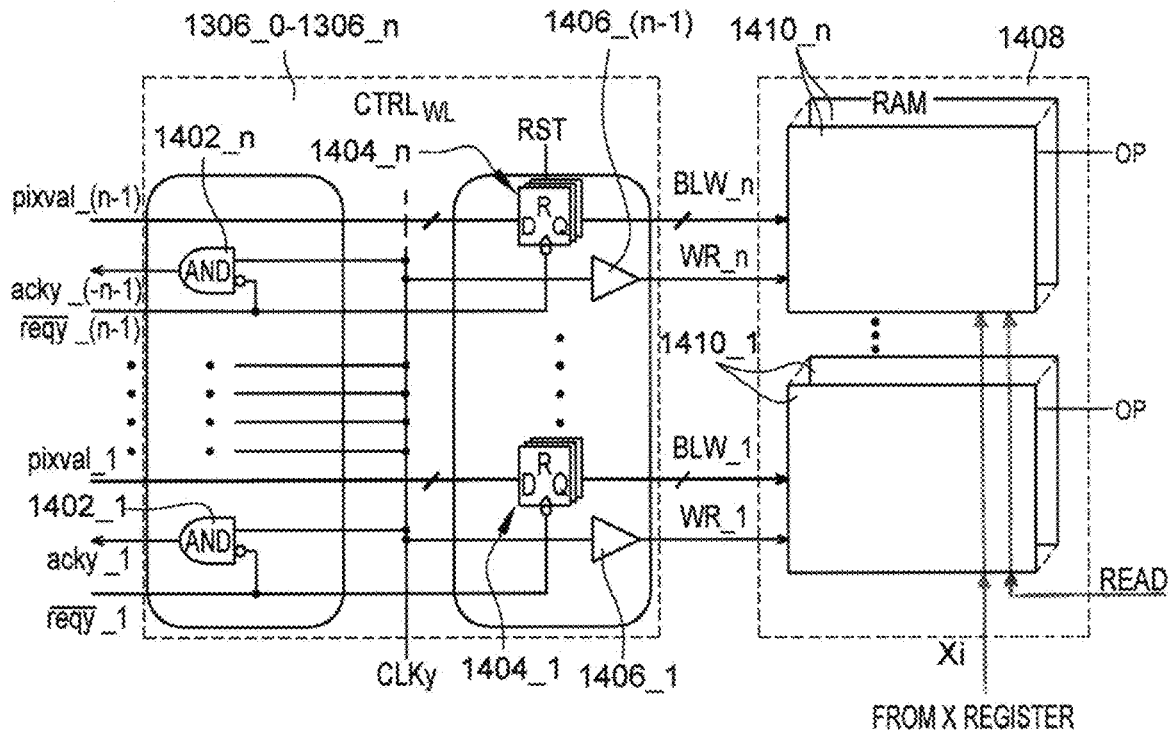
FIG. 15 schematically illustrates a word line control circuit and one column of a memory of the sensor of FIG. 13 in more detail according to another example embodiment of the present disclosure.

FIG. 15 schematically illustrates the n row write control circuits 1306_1 to 1306_n, and one column of a memory 1302 of the sensor of FIG. 13, in more detail according to an example embodiment of the present disclosure. The embodiment of FIG. 15 has many features in common with the embodiment of FIG. 14, and these features are labelled with like reference numerals and will not be described again in detail. In the example of FIG. 15, rather than receiving the data signal DATA, the data registers 1404_1 to 1404_n each receive a corresponding bit of a corresponding R-bit pixel output signal pixval_1 to pixval_n. The pixel output signals pixval_1 to pixval_n are for example provided on common row lines. The signal is for example asserted by the pixel at the same time as the corresponding request signal $\overline{\text{reqy}\_1}$ to $\overline{\text{reqy}\_n}$, and as such, different values can be read out for pixels of a same column that detect events at the same time.

While the embodiments of FIGS. 14 and 15 are based on examples in which each pixel value comprises a plurality of bits, it will be apparent to those skilled in the art that each pixel value could correspond only to one bit indicating the presence or absence of an event. The memory 1302 then for example stores only one bit, and in such a case, the data registers 1404_1 to 1404_n can be considerably simplified, and the lines DATA (FIG. 14) and pixval (FIG. 15) omitted.

Operation of the sensor 1300 of FIG. 13 is for example similar in some aspects to that of the sensor 300 of FIG. 3A, as will now be described in more detail with reference to FIG. 16.

Figure 16:
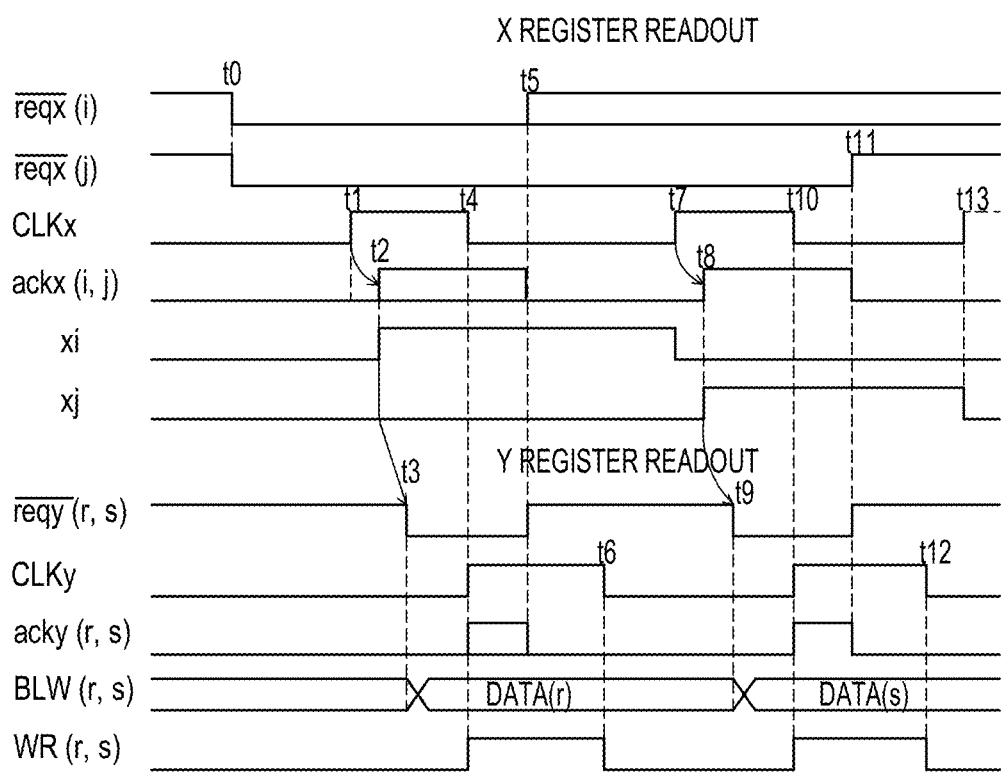
FIG. 16 is a timing diagram illustrating examples of signals in the event-driven sensor of FIG. 13.

FIG. 16 is a timing diagram illustrating examples of signals in the event-driven sensor of FIG. 13. In particular, FIG. 16 is based on an example of the readout of events detected by two pixels at coordinates (i,r) and (j,s), and illustrates examples of: the request signals $\overline{\text{reqx}(i)}$ and $\overline{\text{reqx}(j)}$ for the columns i and j; the signal CLKx, the acknowledgement signals ackx(i,j) for each column i and j, the event detection signals xi and xj for the columns i and j, the request signal $\overline{\text{reqy}(r,s)}$ for the two rows r and s, the clock signal CLKy, the acknowledgement signals acky(r,s) for each row r and s, and the signals BLW(r,s) and WR(r,s) of the rows r and s.

At a time t0, an event is detected by the pixels at coordinates (i,r) and (j,s), indicated by the signals $\overline{\text{reqx}(i)}$ and $\overline{\text{reqx}(j)}$ falling low. Sometime later, a read cycle is initiated, starting with a column scan. To perform the column scan, the signal FLAGx (not illustrated in FIG. 16) is for example asserted as described in relation with FIG. 10. The clock signal CLKx for example has a rising edge at a time t1, which causes the acknowledgement signal $\overline{\text{ackx}(i)}$ to go high at a time t2. Furthermore, the column register 302 for example asserts the corresponding event detection signal xi at or around the time t2.

The acknowledgement signal ackx(i) causes the pixel (i,r) to assert the request signal $\overline{\text{reqy}(r)}$ at a time t3, and this for example causes the corresponding data register 1404 to sample the data or pixel value, and thus assert the signal or signals BLW(r,s) with the new data DATA(r) to be written to the memory. Sometime later, a row scan of the read cycle starts. For example, the signal FLAGy (not illustrated in FIG. 16) is asserted as described in relation with FIG. 10. The clock signal CLKy has a rising edge at a time t4, which causes the signal WR(r) to go high, and data to be written to the memory cells of the column i and row r of the memory. At or around the same time, the acknowledgement signal acky(r) for example also goes high. This in turn causes the pixel (i,r) to bring high the request signals $\overline{\text{reqy}(r)}$ and $\overline{\text{reqx}(i)}$ at a time t5, and the acknowledgement signal acky(r) goes low. The clock signal CLKy and write signal WR(r) then for example go low at a time t6.

The reading and writing to memory of the pixel at coordinate (j,$) then for example occurs with a next rising edge of the clock signal CLKx at a time t7, at which time the signal xi for example going low. The subsequent sequence of operations at times t8 to t13 is similar to those at times t2 to t7, and will not be described again in detail.

An advantage of the embodiment of FIG. 13 is that no column or row address decoder need be implemented between the pixel array and the memory 1302. Furthermore, the pixel readout speed is increased to n*fclk, where fclk is the frequency of the clock signal CLKx. Indeed, it becomes possible to write a whole column of pixels on each clock cycle. As an example, a pixel array comprising 1 million pixels, arranged for example in 1000 columns and 1000 rows, and driven by the clock CLKx at 100 MHz, would for example have a theoretical maximum data rate of 100 Gpixel/s, or an equivalent frame rate of 100 kfps (frames per second), assuming that all pixels of the array generate a request simultaneously.

While the embodiment of FIG. 13 involves the use of flag driver circuits 306 in the column readout circuit 104 that permit particular good readout speeds, in alternative embodiments the column readout circuit 104 could be implemented without flag driver circuits, the column register cells 108 not being bypassed in groups.

An advantage of the embodiments described herein is that the solutions provide a simple and fast solution for reading out column and row addresses of pixel events while avoiding address conflict. In particular, the solution is not based on an arbiter tree, which is a relatively bulky circuit used in some prior art approaches. The solution also has the advantage of being synchronous, one address for example being read out during every clock period of the clocks clkx, clky.

Furthermore, it has been found that very high readout speeds can be obtained as the clock speed can be at 100 MHz or more.

Various embodiments and variants have been described. Those skilled in the art will understand that certain features of these embodiments can be combined and other variants will readily occur to those skilled in the art. For example, it will be apparent to those skilled in the art that while embodiments have been described in which each pixel is configured to assert the column readout request signal first in response to the detection of an event, and in response to the column acknowledgement signal, to assert the row readout request signal, it would also be possible for each pixel to start by the row readout request, and in response to the row acknowledgement signal, to assert the column readout request.

Furthermore, while embodiments have been described that use X and Y encoders to generate addresses, alternative implementations, particularly in the case of relatively small arrays, could instead involve the use of one or more external counters to count the number of '0' among the addrx and addry signals before the first '1' is found, this count value therefore indicating the position of the event in the X or Y register, and thus the address.

Further still, while in the described embodiments each group g of column register cells 108 comprises a same number r of cells, in alternatively embodiments the value of r could vary among the groups.

The invention claimed is:

1. An event-driven sensor comprising:
a pixel array;
a column readout circuit coupled to column output lines of the pixel array, the column readout circuit comprising a plurality of groups of column register cells, each group of column register cells comprising at least two column register cells, each column register cell being coupled to a corresponding one of the column output lines, the column register cells of each group being coupled in series with each other to propagate a first flag signal from a first to a last column register cell of the group, wherein each column register cell is configured to activate a column event output signal when it receives the first flag signal while the detection of an event is indicated on the column output line; and
a first bypassing circuit for each group of column register cells, the first bypassing circuits being coupled in series with each other to propagate the first flag signal, each first bypassing circuit being configured to propagate the first flag signal:
to the first column register cell of its group if an event is indicated on one of the column output lines coupled to one of the column register cells of the group; and
to a flag output of the first bypassing circuit, bypassing the column register cells of the group, if no event is indicated on one of the column output lines coupled to one of the column register cells of the group.

2. The event-driven sensor of claim 1, wherein each group of column register cells comprises at least four column register cells.

3. The event-driven sensor of claim 1, wherein the first bypassing circuits are arranged in groups, each group of first bypassing circuits comprising a plurality of the first bypassing circuits configured to propagate the first flag signal from a first to a last first bypassing circuit of the group, the event-driven sensor further comprising a second bypassing circuit for each group of first bypassing circuits, second bypassing circuits being coupled in series with each other to propagate the first flag signal, each second bypassing circuit being configured to propagate the first flag signal to: the first bypassing circuit of its group of first bypassing circuits if an event is indicated on one of the column output lines coupled to one of the column register cells of the group of column register cells of one of the group of first bypassing circuits; and
to a flag output of the second bypassing circuit, bypassing the first bypassing circuits of the second group, if no event is indicated on one of the column output lines coupled to one of the column register cells of the group of column register cells of one of the group of first bypassing circuits.

4. The event-driven sensor of claim 1, further comprising a row readout circuit coupled to row output lines of the pixel array, the row readout circuit comprising, for each of the row output lines, or for each of a plurality of sub-groups of the row output lines, a row register cell coupled to the row output line or lines, the row register cells being coupled in series with each other to propagate a second flag signal, wherein each row register cell is configured to activate a row event output signal when it receives the second flag signal while an event is indicated on the row output line, or on one of the row output lines of the sub-group.

5. The event-driven sensor of claim 4, wherein the row readout circuit comprises, for each of the plurality of sub-groups of the row output lines, a row register cell coupled to the row output lines of the sub-group, the row readout circuit further comprising a pattern generation circuit configured to generate a bit pattern indicating the row of the sub-group on which the event occurred.

6. The event-driven sensor of claim 4, wherein each column output line is a shared column output line coupled to each of the pixels of its column, and each row output line is a shared row output line coupled to each of the pixels of its row.

7. The event-driven sensor of claim 4, wherein each column output line is coupled in a daisy-chain to each of the pixels of its column, and each row output line is coupled in a daisy-chain to each of the pixels of its row.

8. The event-driven sensor of claim 4, wherein the column output lines are column readout request lines, the column readout circuit being further coupled to acknowledgement column lines of the pixel array, and wherein the row output lines are row readout request lines, the row readout circuit being further coupled to acknowledgement row lines of the pixel array.

9. The event-driven sensor of claim 8, wherein a first pixel of the array is configured to assert, in response to a detected event, either:
a column readout request on the column readout request line of the column of the first pixel, and to assert a row readout request on the row readout request line of the row of the first pixel in response to an acknowledgement signal on the acknowledgement column line of the column of the first pixel; or
a row readout request on the row readout request line of the row of the first pixel, and to assert a column readout request on the column readout request line of the column of the first pixel in response to an acknowledgement signal on the acknowledgement row line of the row of the first pixel.

10. The event-driven sensor of claim 9, wherein the first pixel of the array is further configured to deactivate the column and row readout requests in response to the acknowledgement signals being asserted on the acknowledgement column and row lines.

11. A method of reading out an event from a pixel of an event-driven sensor, the method comprising:
propagating, through a series of first bypassing circuits of a column readout circuit, a first flag signal, wherein the column readout circuit further comprises a plurality of groups of column register cells, each group of column register cells comprising at least two column register cells, each column register cell being coupled to a corresponding one of the column output lines, the column register cells of each group being coupled in series with each other to propagate the first flag signal from a first to a last column register cell of the group, wherein each first bypassing circuit is configured to propagate the first flag signal:
to the first column register cell of its group if an event is indicated on one of the column output lines coupled to one of the column register cells of the group; and
to a flag output of the first bypassing circuit, bypassing the column register cells of the group, if no event is indicated on one of the column output lines coupled to one of the column register cells of the group; and
activating, by one of the column register cells, a column event output signal when it receives the first flag signal while an event is indicated on the column output line.

* * * * *